United States Patent [19]

Beilinski et al.

[11] Patent Number: 5,123,089
[45] Date of Patent: Jun. 16, 1992

[54] APPARATUS AND PROTOCOL FOR LOCAL AREA NETWORK

[75] Inventors: Michael S. Beilinski, Aledo; William F. Cain, Grand Prairie; Robin L. Iliffe-Weston, Arlington; Donald M. Vail, Dallas, all of Tex.

[73] Assignee: Applied Creative Technology, Inc., Dallas, Tex.

[21] Appl. No.: 368,190

[22] Filed: Jun. 19, 1989

[51] Int. Cl.⁵ ............................................. G06F 13/42
[52] U.S. Cl. .................... 395/200; 364/DIG. 1; 364/242.95; 364/240.9; 364/284.4
[58] Field of Search ................... 370/24, 32, 85.1, 91, 370/110.1; 364/200 MS, 900 MS

[56] References Cited

U.S. PATENT DOCUMENTS

| Re. 31,319 | 7/1983 | Fraser | 364/200 X |
|---|---|---|---|
| 4,430,699 | 2/1984 | Segarra et al | 364/200 |
| 4,513,373 | 4/1985 | Sheets | 364/200 |
| 4,661,902 | 4/1987 | Hochsprung et al. | 364/200 |
| 4,697,232 | 9/1987 | Brunelle et al | 364/200 |
| 4,710,870 | 12/1987 | Blackwell et al. | 364/200 |
| 4,835,674 | 5/1989 | Collins et al. | 364/200 |

FOREIGN PATENT DOCUMENTS 0163577 12/1985 European Pat. Off. .

OTHER PUBLICATIONS

"The Systemizer", Applied Creative Technology, Inc. 1985.

*Primary Examiner*—Thomas M. Heckler
*Attorney, Agent, or Firm*—Hawes & Fischer

[57] ABSTRACT

An improved methodology is implemented in a computer network comprising a plurality of computers connected to a corresponding plurality of network controllers. Each network controller is assigned a unique identification number. In turn each network controller is coupled to a corresponding device. The device is an input/output peripheral, typically a printer, plotter or modem. Bidirectional communication may occur between any one of the computers through the network buffers with any one of the device to allow integration of the output device and the software application running the computer, according to the status and type of device, such as occurs in computer assisted design software, which provides output to plotters and queries the plotter for different operational parameters. Bidirectional communicatiton also occurs in the instance where a modem is used as one of the devices. Printer off-line detection is also provided to allow the requesting computer through its corresponding network controllers to be aware of whether the requested device is not in fact off-line. In particularly, carrier detection is provided from a modem through the network buffers to the requesting source computer for use by the communication applications program. Electronic mail is handled between the network controllers to allow data to be sent from one computer within the network to the other. Direct file transfers between the computers is also provided through the network, so that data may be communicated through the network controllers to the inputs of the controllers coupled to the computers as well as controllers' output ports.

19 Claims, 24 Drawing Sheets

APPARATUS AND PROTOCOL FOR LOCAL AREA NETWORK

BACKGROUND OF THE INVENTION

1. Field of Invention

The invention relates to apparatus and methodology for communicating on a local area network among a plurality of digital devices, and in particular to an improved bus protocol for use in such a local area network.

2. Description of Prior Art

The interconnection of computers and various input and output devices in a private or local area network is well known. In this manner, specialized input and output peripherals may be shared among a plurality of computer stations, such the sharing of as printers and memory archives. However, in any local area network communication between the computers and the peripheral devices must be coordinated and systematized, both for the ease and reliability of communication, and because a potential for conflicting demand on the peripherals exists. The architecture or means by which a plurality of computers on one hand and a plurality of input and output peripherals on the other hand are combined is ideally made user friendly for relatively unsophisticated system users to install and operate their own local area network, while at the same time providing the network, which is flexible enough to handle an expanded number of network users and peripherals.

One such prior art system is the systemizer manufactured by the assignee of the present application, Applied Creative Technology, Inc., of Dallas, Tex. In the Systemizer, an interface box is coupled to each computer user to be joined in the network to allow each network user to access any one of a plurality of printers which may be included in the network and to arbitrate conflicting demands upon those printers by other network users. In the case of conflict, a Systemizer allows the rejected network user to make an alternative printer selection. Computation and printer buffering is provided by the network to free up computer use while waiting for the selected printer to become available. Further, as a network arbiter with intelligence, the prior art Systemizer is capable of making multiple copies of specific documents, merging data from various sources into a single page, recovering and reprinting a document in the event of printer malfunction, translating and filtering data passing through it, providing remote control over a printer and adapting parallel and serial equipment.

However, as successful as the prior art Systemizer has been, it was incapable of bidirectional communication, namely from the output device back to the computer terminals of the network users. This feature is required if CAD plotters and modems are to used as input/output devices. Furthermore, if a printer was off line, the Systemizer has no means of detecting the status condition of the printer. Still further, if one of the peripherals was a modem for external communication from the network, the prior art Systemizer could not support modem operation by inclusion, for example, of any means for carrier detection. Intercommunication between the computers and the network was also difficult in the prior art Systemizer when used, for example, in electronic mail or file transfer.

Therefore, what is needed is an improved local area network apparatus and methodological protocol, which continues to provide each of the advantages and benefits of prior art devices, but is further enhanced and expanded to overcome each of the limitations or shortcomings of the prior art as discussed above.

BRIEF SUMMARY OF THE INVENTION

The invention is an improvement in a method of communicating digital information in a computer network comprising a plurality of computers for providing a source and destination of digital information, a corresponding plurality of network controllers for selectively communicating with the plurality of computers coupled to corresponding ones of the computers, and a corresponding plurality of devices for selectively providing input and/or output functions. The improvement comprises the steps of sending a full duplex data frame to a selected one of the network controllers, designated as a receiving controller. The receiving controller is logged onto a selected one of the devices by another one of plurality of network controllers. The other one of the network controllers is designated as a sending controller. A response is obtained from the receiving controller in the sending controller. The sending controller selectively reacts to the response received from the receiving controller.

As a result, digital information may be transmitted to the computers from the devices as well as from the computers to the devices.

Prior to the step of sending, the sending controller logs onto the selected receiving controller. The receiving controller responds thereto by indicating whether or not the corresponding device coupled to the receiving controller is in use. The sending controller selectively reacts to the response received from the receiving controller to continue operation or to provide an error message.

If the sending controller successfully logs onto the receiving controller, the improvement further comprises the steps of sending a status-check frame to the receiving controller from the sending controller. The sending controller waits for a response from the receiving-network controller. The sending controller selectively reacts to the response from the receiving controller to send digital information to the receiving controller to indicate a communication error.

The improvement further comprises the following steps. A block of data is obtained from memory within the sending controller. The block of data is sent to and stored in the sending controller from the computer. A data frame is selectively sent to the receiving network controller from the memory in the sending controller. The sending controller waits for a response from the receiving network controller. The sending controller selectively reacts to the response from the receiving controller to continue with the step of sending the status-check frame to the receiving controller or indicating a communication error.

The method further comprises the step of sending a log-off frame to the receiving controller.

In the case where the device is another one of the plurality of computers, the step of sending a full duplex data frame comprises a step of obtaining the full duplex data frame from the other one of the plurality of computers.

In one embodiment, in the step of sending the full duplex data frame, the device is a modem and the sending step further comprises obtaining the full duplex data frame from the modem.

The invention is also characterized as an improvement in a method in a computer network comprising a plurality of computers for providing a source and destination for digital information, a corresponding plurality of network controllers for storing and bidirectionally communicating digital information, each one of the plurality of network controller uniquely identified by an ID number and coupled to a corresponding one of the plurality of computers, and a plurality of devices coupled to the plurality of network controllers. The improvement comprises the steps of selecting in one of the network controllers, designated as a sending controller, one of the ID numbers from a user defined list of the ID numbers corresponding to a selected one of the network controllers, temporarily designated as a receiving controller. The sending controller attempts to log onto a one of the devices coupled to a corresponding receiving controller having the selected ID number associated therewith. The sending controller determines whether the attempted log onto the selected receiving controller was successful. If the attempted log on was not successful, the sending controller determines if other ID numbers can be selected from the autoscan list. The sending controller continues with the step of selecting an ID number from another selected one of the ID numbers in the autoscan list followed by the steps of attempting log on and determining whether log on was successful until log on is successful.

As a result, a select one of the computers utilizing the autoscan list automatically selects and is logged onto one of the plurality of devices without user intervention.

The invention is also an improvement in a method of digital communication in a computer network comprising a plurality of computers for generating and accepting digital information, a corresponding plurality of network controllers coupled to the plurality of computers, and a plurality of corresponding devices coupled to the corresponding plurality of network controllers. One of the devices is a modem. One of the network controllers is designated as a sending controller, and the network controller coupled to the modem is designated as a receiving controller. The improvement comprises the step of reading in the receiving controller the status of a carrier detect signal from the modem, and sending a carrier-detect frame to the sending controller logged onto the receiving network controller. The carrier-detect frame has information in it that is used to provide a logic signal to the computer to indicate the real-time status of the modem's carrier detect signal. The carrier-detect frame includes information indicative of whether a carrier detect signal is present on the modem.

As a result, modem communication in the computer network is provided.

Prior to the step of reading the status of carrier-detect signal, a determination is made whether the device corresponding to the receiving network controller is a modem.

The invention is still further an improvement in a method in a computer network comprising a plurality of computers for providing a source and destination for digital information, and a plurality of network controllers for storing and bidirectionally sending and receiving information. The corresponding plurality of network controller is coupled to the plurality of the computers. A corresponding plurality of devices is coupled to the plurality of network controllers. The improvement comprises the steps of testing whether a selected one of the devices is busy during a predetermined time interval. It is then determined if one of the plurality of network controller is attempting to log onto the device. A device off-line message is sent to the one network controller attempting to log onto the device, if the step of testing shows the device to be busy for the predetermined time period.

As a result, device off-line detection is provided within the computer network.

The invention is also an improvement in a method in a computer network comprising a plurality of computers for providing a source and destination for digital information, a corresponding plurality of network controllers for storing and bidirectionally communicating the information, and a plurality of devices coupled to the plurality of network controllers. The plurality of network controllers is coupled to corresponding ones of the computers. The improvement comprises the steps of sending a seize-mailbox frame to a selected one of the plurality of network controllers, designated as a receiving controller, from another one of the network controllers, designated as a sending network controller. The sending controller then waits for a response from the receiving network controller. The sending controller selectively reacts to the response from the receiving controller to send a mail message to indicate that the mailbox is already seized by another one of the network controllers or to generate an error message.

As a result, electronic mail is provided within the computer network.

The improvement further comprises the steps of sending a mail-data frame to the receiving network controller. The sending controller waits for a response from the receiving network controller. The sending controller selectively reacts to the response from the receiving network controller to resend the mail-data frame to indicate that the receiving controller's mailbox is full, to indicate an error message, or to detect successful transmission of the mail-data frame to the receiving controller. The sending controller then determines whether the mail message has been completely sent. Another block of the mail message is selectively sent, if the step of determining indicates that the mail message has not been completely sent.

If the step of determining indicates that the mail message has been completely sent, the improvement further comprises the steps of sending a release-mailbox and accept-mail frame from the sending controller to the receiving controller. The sending controller waits for response from the receiving network controller. The sending controller selectively reacts to the response received from the receiving controller to indicate that mail was successfully sent or to indicate that an error occurred.

If the step of selectively reacting to the response from the receiving controller indicates an error occurred, the improvement further comprises the step of sending a release-mailbox and reject-mail frame to the receiving controller from the sending controller.

The invention can be better visualized by now turning to the following drawings.

The invention and its various embodiments may be better understood by now turning to the following detailed descriptions.

DETAILED DESCRIPTION OF THE PREFERRED EMBODIMENTS

An improved methodology is implemented in a computer network comprising a plurality of computers connected to a corresponding plurality of network controllers. Each network controller is assigned a unique identification number. In turn each network controller is coupled to a corresponding device. The device is an input/output peripheral, typically a printer, plotter or modem. Bidirectional communication may occur between any one of the computers through the network buffers with any one of the devices to allow integration of the output device and the software application running the computer, according to the status and type of device, such as occurs in computer assisted design software, which provides output to plotters and queries the plotter for different operational parameters. Bidirectional communication also occurs in the instance where a modem is used as one of the devices. Printer off-line detection is also provided to allow the requesting computer through its corresponding network controllers to be aware of whether the requested device is not in fact off-line. In particular, carrier detection is provided from a modem through the network buffers to the requesting source computer for use by the communication applications program. Electronic mail is handled between the network controllers to allow data to be sent from one computer within the network to the other. Direct file transfers between the computers is also provided through the network, so that data may be communicated through the network controllers to the inputs of the controllers coupled to the computers as well as controllers' output ports.

The invention is most easily understood by first describing the general operating functions of the device, then describing the hardware in which the functions are performed, and finally outlining the software through which the functions are controlled and implemented in the described hardware.

Figure 1:
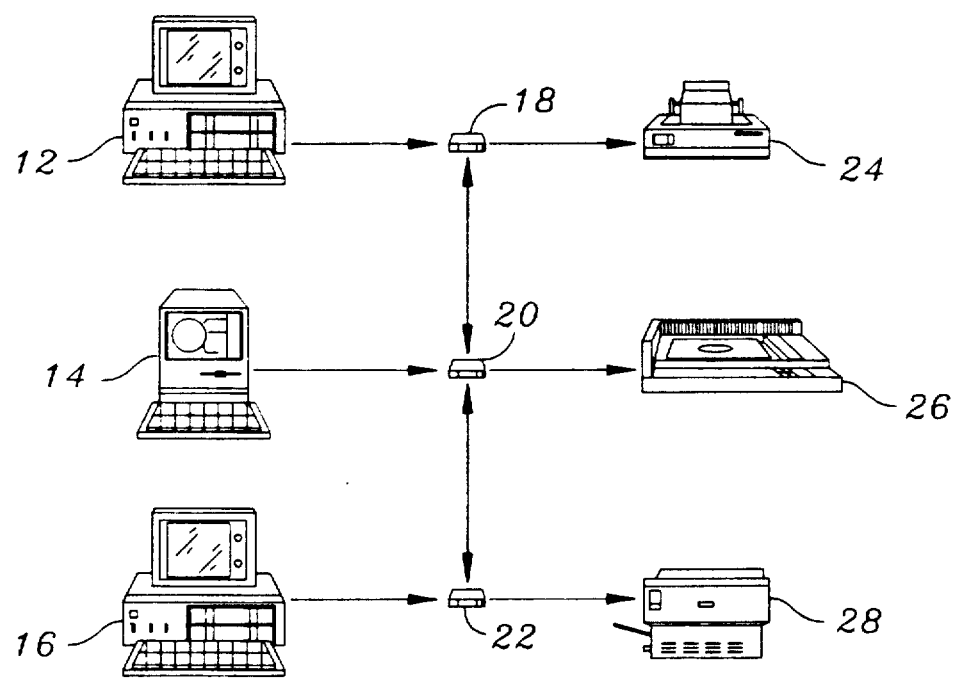
FIG. 1 is pictorial illustration of a network incorporating the invention.

Consider first the operational functions of the device. The device, sold under the trademark Systemizer Plus by the assignee, can best be characterized as an intelligent network node controller for use in local area networks. Turn now to FIG. 1, which is a simplified box diagram of a local area network 10 in which a device incorporating the invention is employed. In the simplified depiction of FIG. 1, three computer stations 12-16 are coupled to network node controllers 18-22, respectively, to three printers or input/output devices 24-28, which are shown in FIG. 1 as an impact printer 24, a laser disk 26, and a laser printer 28. Each network node controller 18-22 is capable of being intelligently controlled, either by the user through a series of pushbutton controls which comprise the keyboard of each controller, or through embedded commands included within the data transmitted from computers 12-16 to network node controllers 18-22, respectively.

Any one of the printers 24-28 may be selected for any print job in any order by any one of computers 12-16. The print job is stored in its respective network node controller 18-22 in a queue in a buffer memory, which is sequentially read out of the network node controller into the specified printer, or may be taken out of order through special bypass commands. Operation of each network node controller 18-22 may be arbitrarily controlled at any point through the use and manipulation of keyboard buttons on each controller.

Certain aspects of the network and network protocol in which the circuitry operates should be understood. In a network, such as that shown in FIG. 1, each of the units coupled to the network potentially have access to all data being transmitted. In the illustrated embodiment, only the addressed controller ultimately obtains access to the network data. It must be understood that may other types of network organizations may be utilized in connection with the invention in addition to the simple network illustrated in FIG. 1.

The operation of the network can be described as a multiple access, status line sense, collision avoidance network. The network cabling is comprised of four conductors labelled as:
1. a network data;
2. a signal ground;
3. a STATUS A; and
4. a STATUS B.

The network data wire carries serial data from any single transmitting node to all the other nodes in the network for reception. The signal ground wire establishes a reference point between units for the other three signals. Status lines A and B are the control signals which govern access to the network. All three signal lines, network data, STATUS A, and STATUS B are bidirectional, depending on the operation and the control of the CPU within the network node controllers 18-22.

The assumption with respect to use of the network is that only one unit or network node controller 18-22 at a time can provide output signals. This requires a network protocol to avoid collision between two or more network node controllers, which attempt to output simultaneously. Collision avoidance is provided through the network protocol. Each network node controller 18-22 has a node address set by dip switches included within the network node controller. In the illustrated embodiment, five dip switches are provided, making the total possible number of units connected to the network equal to 31.

It is expressly to be understood at this point, as well as throughout the discussion of the illustrated embodiment, that specific capacities of circuit elements may be modified according to the teaching of the invention without departing from its spirit and scope. Therefore, although the illustrated embodiment has a capacity for 31 network node controllers, it can obviously be expanded to include any number.

The network protocol has two major interacting features. First the step of obtaining control of the network via status lines, STATUS A and STATUS B, and second the step of utilizing control codes. For example, typical access to the network starting from the initial log-on to the completion of a print job and its corresponding log-off is comprised of the following steps. A user prepares to print from his application or program. His first step is to select which printer 24-28 which he intents to use. This is done by pressing one of the numbered keys on network node controller 18-22 to which he has access, typically installed in close proximity to the corresponding unit 12-16. The user does this by pressing one of the numbered keys on keyboard ON each network node controller or including the appropriate software command within his data.

Each network node controller 18-22 has a unique ID number associated with it. The printer corresponding to it also has a unique ID number which is simply the ID number of the network node controller 18-22 corresponding to it. For example, network node controller 18 corresponds to printer 24, network node controller 20 to printer 26, and so forth. Assume that network node controllers 18-22 have the ID numbers 1-3, respectively. Further assume that the user of computer 16 wishes to access printer 24. The user of computer 16 will first need to link himself to network node controller 18 by sending a log-on request word and receiving an acknowledgement. But before sending the control word, he must first gain control of the network. This is done by monitoring status signals, STATUS A and B, to determine when the network is available.

The logic level of status line A is read. If it is high, the network is currently being claimed by another unit. As soon as STATUS A goes low, indicating the inactive state showing that no network node controller is presently using the network, network node controller 22 can then attempt to claim the network before any other unit sends its log-on request to network node controller 18 (ID 1). The first action taken is to assert the active level on line STATUS A to lock out other units from claiming the network. If collision should occur from another network node controller attempting the same action, network node controller 22 will wait a unique period of time, predetermined for network node controller 22, which is different from the period of wait time assigned to each of the other network node controllers 18 and 20 within this network.

At the end of the predetermined and unique wait period, network node controller 22 will then check the STATUS B signal. If STATUS B is still inactive, the network is considered still available, so the final action can be taken to raise the STATUS B line to an active level.

STATUS A and STATUS B timing thus avoids the possibility of two units claiming the network simultaneously. If two units happen to initiate the sequence at the same time, the one with the lower ID number has a shorter wait period before checking or activating the STATUS B signal. The unit with the longer waiting period would then discover the STATUS B active and abort its attempt to gain access to the network. Thereafter, the network node controller being denied access to the network restarts its cycle.

Although such a priority would appear to give preference to units with lower ID numbers, in actually this does not occur, since collision occurs only if two units are in nearly perfect synchronization in their requests.

Once network node controller 22 has control of the network it can send its log-on request, which is comprised of three bytes. When STATUS B is active, a nonmaskable interrupt occurs in all controllers on the network. The purpose of the interrupt is so that they will read the first byte, which is the destination address, to determine which of the network node controllers within the network is being addressed. All units with ID's other than the chosen destination ID will ignore all further data on the network, so as to not further waste their CPU time processing irrelevant data. Therefore, the first byte is the receiving or destination controller's ID and the second byte is the source or sending controller's ID. The third byte is a control code or frame identification indicating the operation which the source or sending controller, in our example network node controller 22, intends to execute.

In our example, the source of sending controller, network node controller 22, is requesting to log-on. Network node controller 22 will continue to claim the network and hold all the status lines while it is waiting a response. The responses network node controller 22 could receive from other network controllers include three possibilities. First, an acknowledge signal, ACK, signifies that the log-on request is granted, network node controller 22 will have an LED within the pressed button, which will then light, indicating a successful log-on to the requested destination. The log-on condition will remain until log-off occurs by manually or automatic means discussed below.

A second possibility is a not acknowledged signal, NAK, which means that the selected destination controller, in our example network node controller 18, is already logged-onto. Network node controller 22 is a source or sending controller will indicate this by blinking corresponding LED within the push button on and off. Network node controller 22 will continue to periodically try to relog-on in a manner similar in nature to automatic telephone redial.

The third possibility is that no response could be received by network node controller 22 within a predetermined period, such as if the destination controller does not exist, is not powered on, or there is some other type of failure. Network node controller 22 will then light a front panel error light to indicate to the user of computer 16 that the indented destination controller did not respond. In any case, network node controller 22 will relinquish the network status lines. In the instance of receipt of an NAK signal, network node controller 22 releases the network and then competes for it again among other requesting network node controllers, if any, in order to relog-on.

Assume that the user of computer 16 through network node controller 22 has now successfully logged-on to network node controller 18, ID 1. He may now send print data to its corresponding printer 24. Any data coming from his computer 16 will automatically be transmitted over the network and sent to printer 24, attached to destination controller ID 1, network node controller 18. Data comes in to the input data port of network node controller 22 from computer 16. It is placed within network node controller 22's network memory and there collected in a transmit block of 253 bytes. If less than 253 bytes are available for transmission, a 0.2 second timer will termination collection. A one byte check sum (modulo 256) is calculated and added to the end of the data block.

Network node controller 22 then competes for the network as described above. Once successfully logged-on to the network, a frame of data is sent. A frame of data is comprised of one byte showing the destination address, one byte showing the source address, a one byte protocol code or frame identification showing that data is being sent, a one byte data field length, between one to 253 bytes of data, and a one byte check sum.

After sending the data frame, network node controller 22 maintains control of the network and waits for a response from its destination network node controller 18. As described above, one of the three responses are returned, namely, ACK, indicating that the data was received; NAK, indicating that there is a error detected in parity, check sum, or character count; or no response within a time out, indicating that the destination network node controller 18 went off line.

In any case, network node controller 22 relinquishes control of the network and begins competing for it again among the other controllers to send a succeeding frame of data. If the previous frame had an error, indicated by a returned NAK signal, the same frame of data will be resent. If the frame of data cannot be successfully sent after a predetermined number of tries, network node controller 22 will abort and light the error light.

Data will thus continue to be sent in this manner from computer 16 to printer 24 until no more data is available in the memory network node controller of network node controller 22. Printer 24 is then released and may be accessed by other users. The normal method for release is to press a numbered key button on network node controller 22 corresponding to printer 24, or more technically its ID number. However, as the user's discretion, network node controller 22 can automatically initiate a log-off procedure following a no more data time out.

In any case, network node controller 22 competes for network control and then sends a three-byte frame comprising the source and destination addresses and a third byte having a protocol code indicating log-off. The response from the destination network node controller 18 is always the ACK signal.

Therefore, network frames are of two types, namely a short frame and a long frame. A short frame has a first byte which has the destination address, a second byte which has the source or sending address, and a third byte which has the frame identification as described above. The long frame has the same first three bytes but a fourth byte of data length, a fifth block which is comprised of one to 253 bytes of data, and a one byte check sum.

A network frame identification is a byte which is comprised of three fields. Bits 0 through 2 are subcommands and bit 3 identifies the device, while bits 7-4 comprise the command. The command field in most cases identifies the meaning of the network frame. For some frames, the command field identifies the frame as one of a possible group of frames. In a case where a group of frames is identified, the subcommand field is used to distinguish among them.

The device field identifies the device associated with the frame. For example, if the device field is 0, the frame refers to an output device, such as printer. If the device field is 1, the frame refers to an input device, such as a computer. Therefore, communication between computers would show the device field set at 1.

A listing of network frame identification bytes, together with their meaning and responses which would be sent upon receipt of such a frame, are set forth in Appendix 1. Again, it is to be expressly understood that the types of frames identified in the illustrated embodiment are illustrative only and that additional or modified frames may be provided according to the teachings of invention.

A network session refers to communication that occurs when a network node controller with one ID logs onto the device of another ID or the same ID. In the illustrated embodiment, if a network node controller logs-on its own corresponding output device, the network is bypassed. In prior art devices, the network was used, even when the network node controller logged-on to its own device.

A session is initiated when a sending network node controller or sender sends a log-on frame during the session to a receiving network node controller or receiver, and successfully logs-on either the receiver's input or output device. Each of the receiver's input or output devices can be engaged in simultaneous sessions with their own sender, but at no time can a device be engaged in more than one session. While FIG. 1 has been described only in connection with output printers, it must be understood that one of the advantages of the invention is that it allows bidirectional communication among any of the units coupled to the network nodes regardless of whether the primary function of the unit is input, output or both.

A network session is terminated when the sending network node controller sends a log-off frame or when the receiving network node controller senses that the connection has somehow been broken, which causes an error condition to arise in the sending network node controller. If the receiving network node controller sees a frame that is sent during an active session, but that receiving network node controller is not in a network session with the network node controller having the ID that sent the frame, the receiving network node controller will assume that it would be in a session with the sending network node controller. If the receiving network node controller is not in a session with any other network node controller, it will then put itself into a session with the network node controller sending the frame. This allows for re-establishment of sessions that have been temporarily broken.

During an active session, the receiving network node controller transmits a cross check frame every five seconds to the sender to see if the sender is still engaged in a session. If the sender does not respond or indicates that it is not still engaged in a session, the receiving network node controller will assume the session has been terminated.

During an active session, the sender will issue at least one status check frame every five seconds to make sure that the receiving network node controller is still engaged in a session as well. If the receiving network node controller does not respond or responds with an error condition, the sending network node controller will indicate a network error. In this case, the sending network node controller will continue to issue status checks to try to re-establish the session. If the user presses a system key provided on the front of his corresponding network node controller to reset the error, the sending network node controller will terminate the session.

When the sending network node controller has data to send to the receiver's output device, the sending network node controller will send a status check command to see if the device can receive another frame of data. The sending network node controller will continue to issue status checks until the receiving device can receive the frame of data. The sending network node controller then sends the frame of data and, if successful, returns to issuing status checks until the receiver's device can accept the next frame of data.

The sending device will continuously resent frames of data that do not receive an ACK from the receiving controller. After several attempts to send a frame, the sending controller will indicate an error to the user, but continue to try to send the frame. Again, the user may reset the system by pressing a system key on the corresponding sending network node controller to terminate a network session.

The receiving network node controller passes full duplex data to the sending network node controller using the full duplex send and resend commands. The receiving network node controller will try to send a frame of full duplex data several times, and if the data is not acknowledged, it will quit, not indicating any error.

The receiving network node controller indicates that its output device is off line by sending off-line frames to the sending network node controller. When the output device is off line, these frames will be sent every two or three seconds. The absence of off-line frames means that the device is assumed to be on line.

If the receiving network node controller's corresponding device is a modem, the receiving network node controller will issue carrier detect frames to the sending network node controller every 0.5 seconds to indicate the status of the carrier detect signal.

Consider now the operation of a network electronic mail session. A network mail session refers to communication that occurs when a network node controller with one ID sends a mail message to a network node controller with a different ID. A mail session is initiated when a sending network node controller requests to seize the receiving network node controller's mailbox. The receiving network node controller's mailbox can be seized only by one sender at a time, and the seizure of the mailbox prevents two senders from trying to send a message at the same time.

The sending network node controller breaks the mail message into frames and sends the frames over the network to the receiving network node controller. The receiving network node controller will not accept the data frames unless its mailbox has been seized by the sending network node controller. The receiving network node controller communicates to the sending network node controller whenever a transmitted frame causes the receiving network node controller's mailbox to become full.

After sending the mail message frames, the sending network node controller releases the receiving network node controller's mailbox with one of two frames; namely, a receive and accept frame which advises the receiving network node controller to keep the mail message which was just sent; or a receive and reject frame which advises the receiving network node controller to disregard the mail message that was just sent.

If a receiving network node controller's mailbox is seized, and five seconds elapse without receiving a data frame from the sender, the receiving network node controller will release its mail box. Any subsequent frames sent by the sending network node controller will not be accepted by the receiving network node controller after release of the mailbox. This action is to prevent a mailbox from being permanently seized in the event that the sender does not complete the mail session for any reason.

In the illustrated embodiment, two devices can be designated as the receiving network node controller for each sending network node controller. One is the output device or printer for a computer-to-printer communication and the other is an input device or computer for a computer-to-computer communication. These two receiving units operate independently and can simultaneously support a single sending network node controller.

Each receiving controller, therefore, has the following tasks. The receiving controller must respond to the network frames intended for it and know the ID of the current sender. The receiving controller must maintain a queue of ID's of those units wishing to log-on to it, and periodically send frames to the current sender to: (1) cross check to make sure the sender is still there; (2) send off-line frames when the device is off line; and (3) carrier detect frames if the device is a modem. The receiving controller must also maintain a small buffer to receive data frames to send the data to its corresponding object device.

To accomplish this function, each receiving network node controller has the following data structure, or output control block, OCB, with the following information. First, the ID of the current sender, if any; second, a queue of ID's of units waiting to log-on, if any; and third, input and output pointers for a circular buffer holding data received from the network. Each receiving network node controller also has a small buffer, which holds data sent over the network by the sending network node controller.

In the illustrated embodiment, a 512-byte circular buffer is used, which is large enough to hold double network node controller data frames.

Each receiver network node controller also has three associated pointers in its output control block, OCB. An RX pointer points to the location of the next byte received from the network which byte is to be stored when the frame is received. An input pointer points to the location of the first byte of the next frame to be stored. An output pointer points to the location of the next byte that is to be sent to the controller's device.

At the start of the data frame, the RX pointer is equal to the input pointer. For each byte in the frame, the RX pointer is incremented. If the complete frame is received with no errors, the input pointer is brought up to the RX pointer. If any errors are detected in the frame, the RX pointer is brought back to the input pointer. The input pointer points to the first location after the last byte of validated data.

Data between the output pointer and the input pointer is sent to the corresponding device of the receiving network node controller. The output pointer is incremented for each byte send t the device. The network node controller is considered empty when the output pointer reaches the input pointer, because any data after the input pointer has not yet been validated. The receiver sends data to its corresponding output device in a main program loop. The process of sending the data to the output device is asynchronous with respect to the receipt of data from the network.

A receiver which is coupled to an input device sends data in serial form to the input device using transmit buffer empty interrupts. The process of sending data to the device is also asynchronous with respect to the process of receipt of data from the network.

When a sending network node controller attempts to log-on to a receiving network node controller, its ID is either stored as the current sender or, if there is already a sender, its ID is put into a queue of ID's within the receiving network node controller waiting to log-on to it. The queue within the receiving network node controller is a FIFO buffer, with the new ID's being put at the end of the queue.

A capability is provided for preferential log-on in which an ID can be placed in front of other ID's requesting a normal log-on. In the case where there is more than one preferential ID requesting such a log-on, a FIFO queue is established among the preferential ID's. To maintain its place within a queue, a requesting network node controller must constantly send log-on requests to the receiving network node controller, which it does once per second. An ID is removed from the queue by the receiving network node controller if three seconds expire without the requesting controller sending a log-on request. An ID removed from the queue will be placed at the end of the queue the next time it issues a log-on request.

Network software routines are divided into two types, a low level or background routine and a high level or foreground routine.

A low level routine forms complete short frames in the first three fields of a long frame, which are to be sent over the network. Low level routines bypass the network if a sending controller seeks to send a frame of data to its own corresponding I/O device. Low level network routines are used to attempt to gain control of the network by asserting the status lines. These routines also deal directly with the circuitry described in FIGS. 2-10 to send data frames over the network byte by byte and to send responses to the frames. In addition, error checking. such as parity errors and check sums for long frames, are handled by the low level network routines.

High level network routines schedule the use of the network for various processes which need it. Network sessions are created, maintained, and terminated through the sending network node controllers by high level network routines. These routines also maintain network sessions for the receiver and handle network mail sessions for the sender. The high level network routines form the last three fields of the long data frames and perform any other network tasks.

Interface between low and high level routines is limited. When a high level routine needs to send a frame over the network, it calls upon a low level routine entitled SET HEADER to form the frame. The high level routine also calls up a low level routine entitled TRY NETWORK to attempt to gain control of the network and start sending the frame. Control is returned to the high level routine as soon as it determined that the network is already in use or that the network is claimed by asserting the two status lines in the first byte of the frame that has been sent over the network. After a high level routine has called the low level routine TRY NETWORK, it continuously calls the low level routine RSP LOOK until a response has been received.

Consider now the operation of the low level routine, TRY NETWORK. The TRY NETWORK routine checks to see if the destination network node controller is the same as the source or sending network node controller, that is, whether the controller is trying to send a frame to itself. It is, the network is bypassed and the data frame is passed to a routine which handles received frames. The frames are processed and a response is returned and stored.

The TRY NETWORK routine also attempts to gain control of the network if the source or sending network node controller is different from the destination or receiving network node controller by asserting the status lines.

The TRY NETWORK is responsible for correct timing based upon the respective ID numbers of the network node controllers. Time spend between asserting STATUS A line and STATUS B line is either idle or wasted time in a loop. When STATUS B line is asserted, TRY NETWORK generates a nonmaskable interrupt. The nonmaskable interrupt serves to set up the software to receive a new frame over the network, including enabling the character RX interrupt.

The transmission of frames which a controller can receive in response to sent frames is done in the background at the interrupt level. After a controller gets control of the network by asserting the status lines, it sends the first character of the frame over the network and then enables the transmit controller empty (TXMT) interrupts. All the characters in the frame are sent on the interrupt level. When a controller is sending a data frame over the network, RX interrupts are enabled so that the frame is echoed back. The controller checks the integrity of the frame it is sending on the interrupt level.

After a controller finishes sending a frame, the response, if one is expected, is received with an RX interrupt. The response is recorded in memory and accessed by a high level routine through the RSP LOOK routine.

If an expected response is not received, the no-data timer will expire and store a dummy response, indicating an error for the high level network routine. The timer routine is also on the interrupt level, namely the heartbeat interrupt. The high level network routines are never aware of the network activity for sending frames and receiving responses. High level network routines only initiate the sending of the frame through TRY NETWORK and get the response through RSP LOOK.

The complete process of receiving frames over the network and responding to frames is done i the background on the interrupt level. Frames are received over the network byte by byte using character received RX interrupts. As soon as a unit determined that a frame is not intended for it, it turns off the character RX interrupt so that it till not be interrupted for the remaining characters in the frame. When a controller determines that a frame data is intended for it, and when the last character of the frame is received, the interrupt service routine determines and sends response for the frame.

Turn now to the general operation of the high level network routines. On each pass through the main program loop, control is passed to the currently executing high level routine in the form of a call. The high level network routines can thus be thought of as coprocesses. Each time a routine is called, it will execute and then pass control back to the caller. When the routine passes control back to the caller, the point where it passes control back is stored. The next time the caller calls the routine, it will resume at the place of last execution.

A high level network routine will continue to execute until it completes a logical task, such as sending a frame over the network and receiving a response to the frame. A high level network routine can also become blocked, meaning that it is waiting for an event to occur before it can continue execution. For example, a high level routine initiates the sending of a frame over the network. The routine can do nothing until the frame is sent and a response received, so that the routine is blocked and control is returned to the caller.

The next time the high level routine is called, it resumes where it left off and looks for a response. If no response has been received, it is still blocked and control again returns to the caller. On a subsequent time, when the routine is called, it again looks for the response and the process continues.

Because high level routines return control to the caller when they are blocked, and because the transmission of frames is done in the background, the processor in the controller never sits idle while a frame is being sent over the network.

However, the processor does sit idle when the controller is trying to gain control of the network by asserting the status lines. The idle time may be up to 1500 microseconds. However, the processor will process certain interrupts even during this period.

There may be several network processes that vie for use of the network. These processes include the network session sender for the main controller. This network process needs the use of the network if the main controller is in the network session or is logged-on to some device.

Another process is for the network session center for bypass of the network. This network process needs to use the network if bypass is in the network session or is logged-on to some device.

A third network process is the network mail session sender. This network process needs the use of the network if the unit is in the process of sending mail to another unit.

A fourth network session is the network session receiver for an output device which occurs if someone is logged-on to a controller's output device.

A fifth network session is a network session receiver for an input device which occurs if someone is logged-on to a controller's input device.

The high level network routines include a network control which schedules the use of the network between processes which vie for the network. Priority from the highest high level network routine to the lowest is as follows. The highest priority is for the network session receiver for an output device. These sessions are given highest priority because when they use the network certain frames that are sent can be time critical, such as off-line and carrier-detect signals.

Second in order of priority is the network session receiver for an input device.

Third in order of priority is the network mail session sender. The network mail session sender is given higher priority than a regular session sender because sending mail preempts a regular session activity.

The fourth priority is then given to a network session sender for the main controller and for bypass to the device. This type of network session is where most of the network activity occurs. The main controller and bypass have equal network priority and control is multiplexed between the two processes, as discussed below.

Consider now the operation of the network controller. Each time a high level network routine obtains control, the routine executed until it is blocked or until it completes a logical task. If the process is blocked, the routine remembers where it left off and then simply returns control to the main loop. The next time the main loop passes control to the network routines, the process picks up where it left off. If the routine completes a logical task, such as sending a frame or receiving a response, the process remembers where it left off and then passes control to the network controller. The network controller determines which process should be mixed on the network and then passes control back to the main loop. The next time the main loop calls the network routines, the newly called routine has control. When control is given to the new routine, the routine resumes where it left off.

Figure 2:
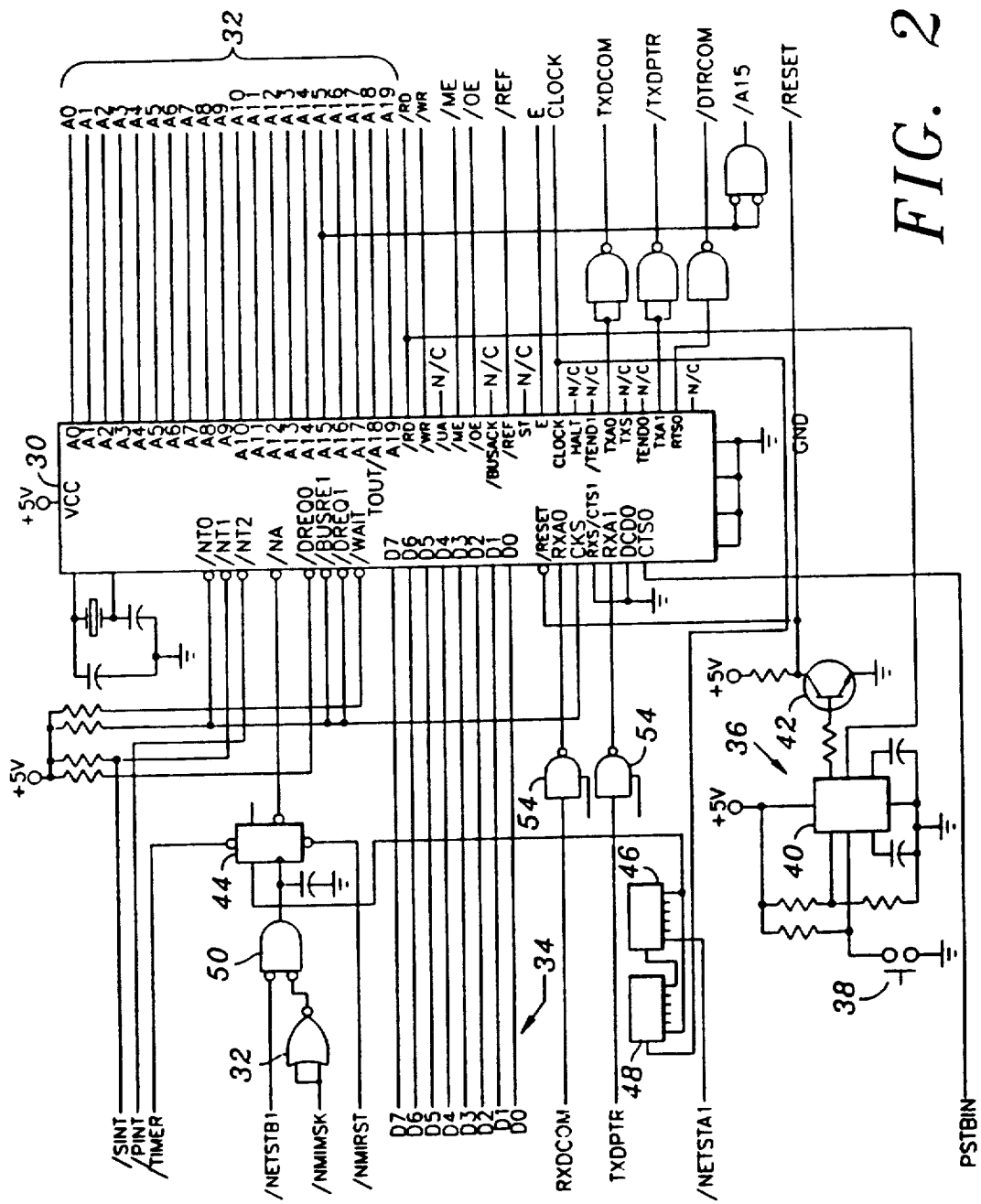
FIG. 2 is a schematic diagram showing the portion of the invention, including the microprocessor.

Before considering the operation further, consider the circuitry of the invention as shown in FIGS. 1-8. Turning first to FIG. 2, a portion of the schematic of the invention is illustrated wherein a CPU 30, which is capable of addressing one megabyte of memory. Output 32 comprises the active high address bus of CPU 30, while inputs D0-D7 comprise data bus 34. CPU 30 provides a number of conventional control signals as well, such as /RD which is an active processor read control signal, /WR an active low processor right control signal, /ME an active low processor memory enable control signal, and /IOE an active low input/output enable control signal. /REF is an active low processor refresh recycle control signal used for memory maintenance, while E is an active low processor enable control signal used generally throughout the circuitry.

The timing signals generated by processor 30 include a system clock signal, CLOCK; an active high transmitted data to computer, TXDCOM; an active high transmitted data to printer, /TXDPTR; and RS232C active high data terminal request to computer signal, /DTRCOM. A general reset signal, /RESET, is generated by reset circuit, generally denoted by reference number 36, which is activated by a push button 38, generated by reset generator 40 and coupled through inverter 42. /RESET is also generated at the /out pin of generator 40 and is used to clamp the read line, /RD. CPU 30 includes a plurality of interrupt input signals, such as /SINT, which is an active low serial data interrupt request; /PINT an active low parallel data interrupt; /TIMER which is an active low timer interrupt request.

A nonmaskable interrupt is provided through D type flip-flop 44 from its /Q output, whose D input is derived from two four-bit counters 46 and 48. Flip-flop 44 is clocked from the output of gate 50, whose input in turn is /NETSTBI, an active low network STATUS B input, and the output of network node controller 52, whose input in turn is /NMIMSK, a nonmaskable active low interrupt mask. D type flip-flop 44 is reset by /NMIMSK, a nonmaskable interrupt request reset. Counters 46 and 48 are in turn driven by CLOCK signal from CPU 30. /NETSTAI, the active low network STATUS A input, is the reset signals to counters 46 and 48. After a predetermined time period as fixed by counters 46 and 48, the D input of flip-flop 44 goes active and the nonmaskable interrupt to CPU 30, /NMI, goes active when flip-flop 44 is clocked by the output of gate 50. In this way if there is crosstalk between the STATUS A and STATUS B lines in long runs, a false STATUS B signal will not be recognized as a valid interrupt until a predetermined time after the STATUS A signal is active.

Finally, certain additional control signals are provided to CU 30 through buffers 54, whose inputs are RXDCOM, an RS232C active high received data from computer signal and RXDPRT, similarly an RS232C active high received data from printer signal.

Figure 3:
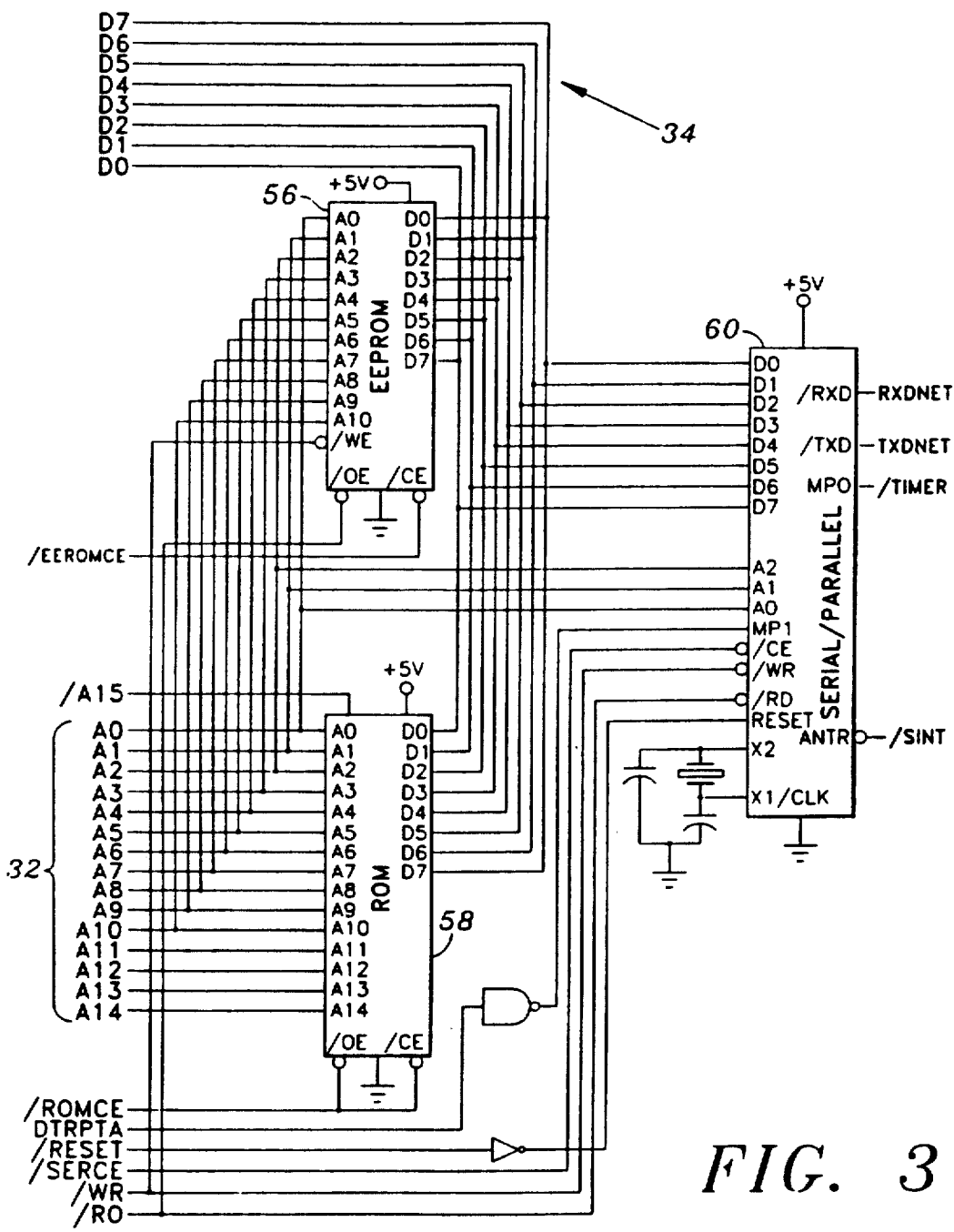
FIG. 3 is a schematic diagram of the portion of the circuitry used for memory expansion.

Turn now to FIG. 3, which is a schematic illustrating another portion of the circuitry of the invention. Address bus 32 is coupled to electrically erasable PROM 56 and ROM 58. ROM 58 stores the program while EEPROM 56 stores various setup parameters which characterize the communication formats and details of data and other protocols.

Data bus 34 is also coupled to a serial-to-parallel transceiver or uart 60. The parallel inputs to uart 60 also include address lines A0-A2 and a number of discrete commands. These commands include DDRPTR, which is an RS232 active high data terminal ready request from a printer and /SERCE, active low serial chip enable. The serial signals include RXDNET which is an active low received data from network, TXDNET, which is an active low transmitted data to network, /TIMER which is a timer interrupt signal discussed in connection with FIG. 2, and /SINT, which is the active low serial data input request, also discussed in connection with FIG. 2.

Figure 4:
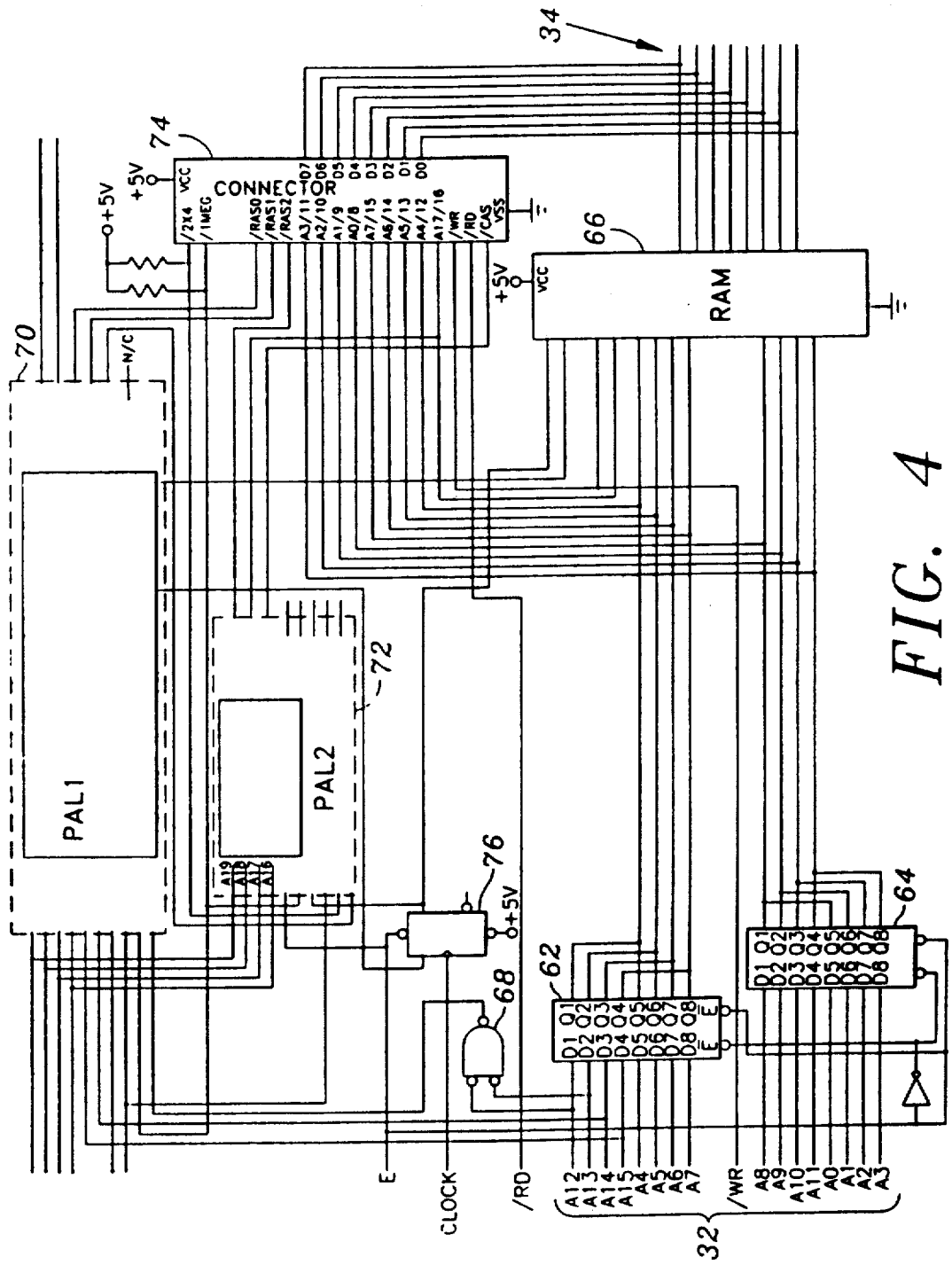
FIG. 4 is a schematic diagram of the invention utilized as a buffer memory.

FIG. 4 illustrates another portion of the schematic wherein a buffer memory is provided within the controller. In the lower left corner of the Figure, address bus 32, together with the /WR signal, is provided to tristate controller drivers 62 and 64. The output of these drivers are then in turn multiplexed to the inputs of RAM 66 which is variously a 64-256K RAM depending on user option.

Selected ones of the address bits, namely addresses A14-A19 are coupled to programmed array logic 70 and 72 together with the discrete command signals /ME, an active low processor memory enable control signal and /REF, an active low processor refresh control signal, which originate with CU 30, as described in FIG. 2. These signals, together with the output of gate 68, which produced a logical function of the address bits A12 and 13, are provided as inputs to a programmed array logic, 70 and 72, which perform the logical functions indicated within the boolean equations set forth in the drawings, to produce the output signals shown in FIG. 4 from PAL 70 and 72.

Figure 6:
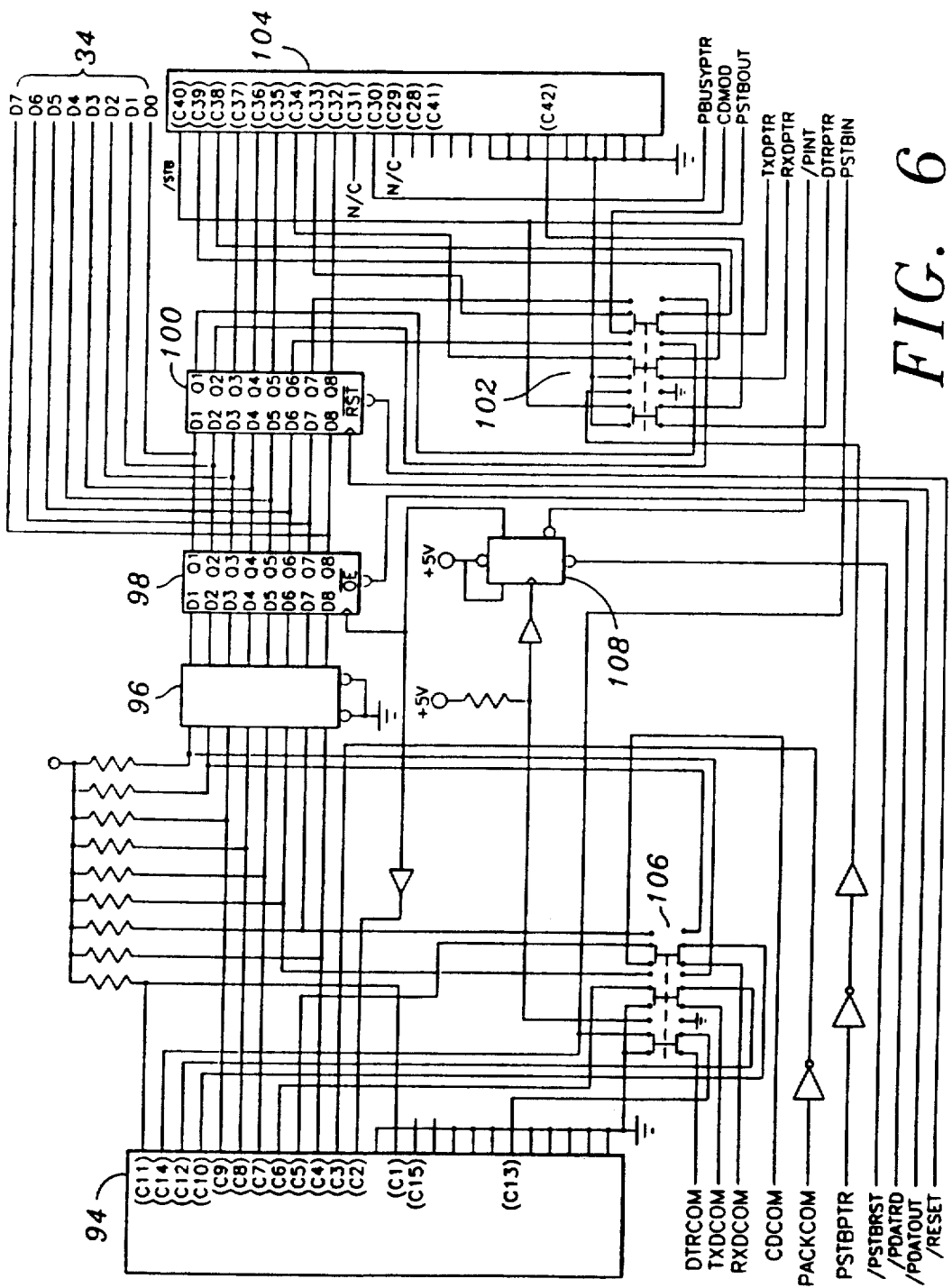
FIG. 6 is a portion of the schematic diagram related to configuration either as a serial or parallel network node controller.

These output signals include /ROMCE, an active low programmable read-only memory chip enable and /EEROMCE, an active low electrically erasable programmable read-only memory chip enable, used as chip enable signals for ROM 58 and EEPROM 56 of FIG. 6, respectively. /RAS0-/RAS2 are active low row address selects for extended memory. Dynamic RAMS are row address selects for one megabyte DRAMS designated as banks 0-2.

The row address select signals, /RAS0-2, together with the address output signals from tristate controllers 62 and 64, and other discrete command signals, such as read-write signals and address select, /CAS, are provided as inputs to piggy-back memory expansion connector 74.

The data outputs from RAM 66 and piggy-back memory connector 74 are both coupled to data bus 34.

Figure 9:
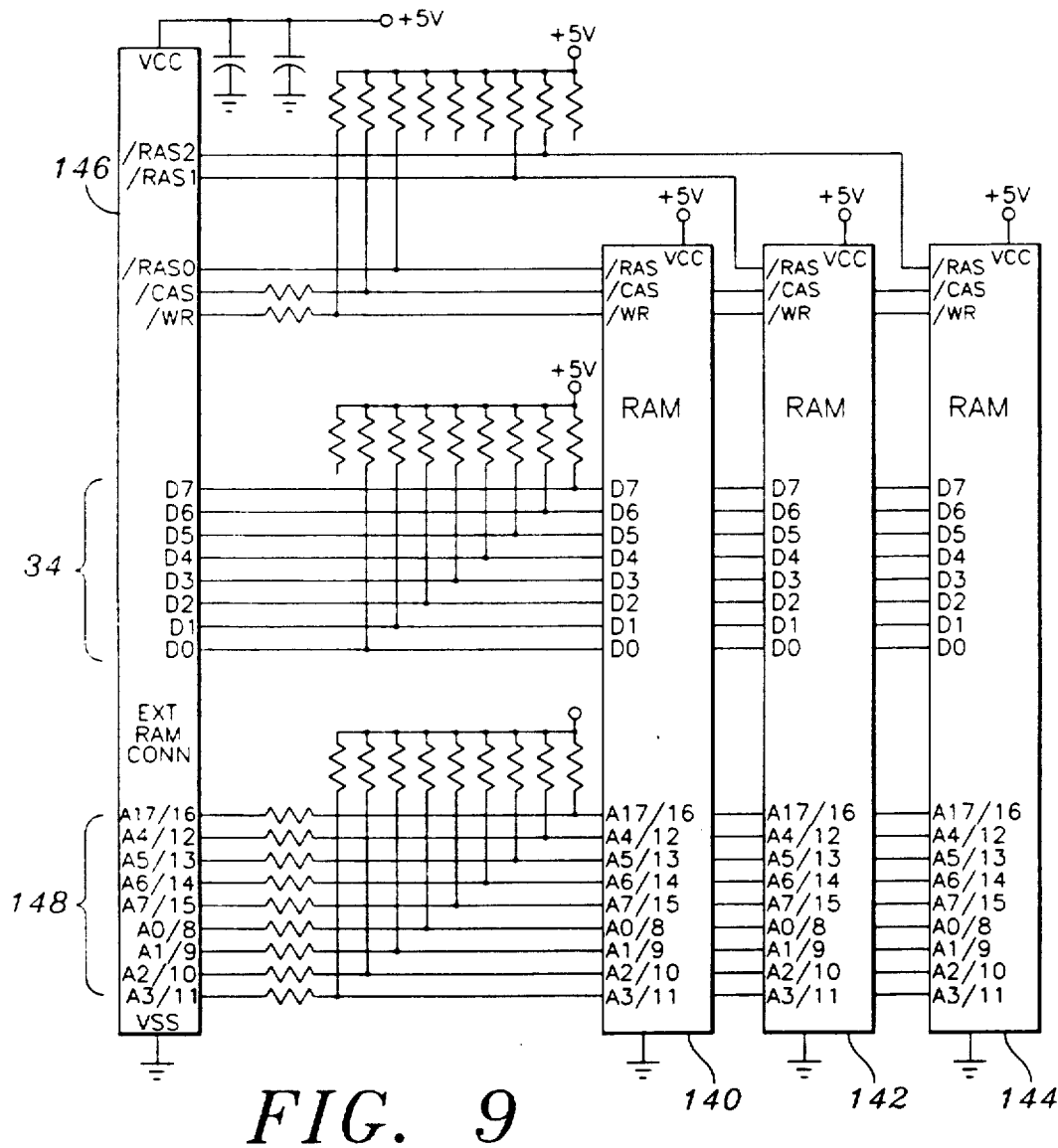
FIG. 9 is a schematic portion of the diagram showing memory extension utilized in connection with the circuitry of FIGS. 1-7.
Figure 10:
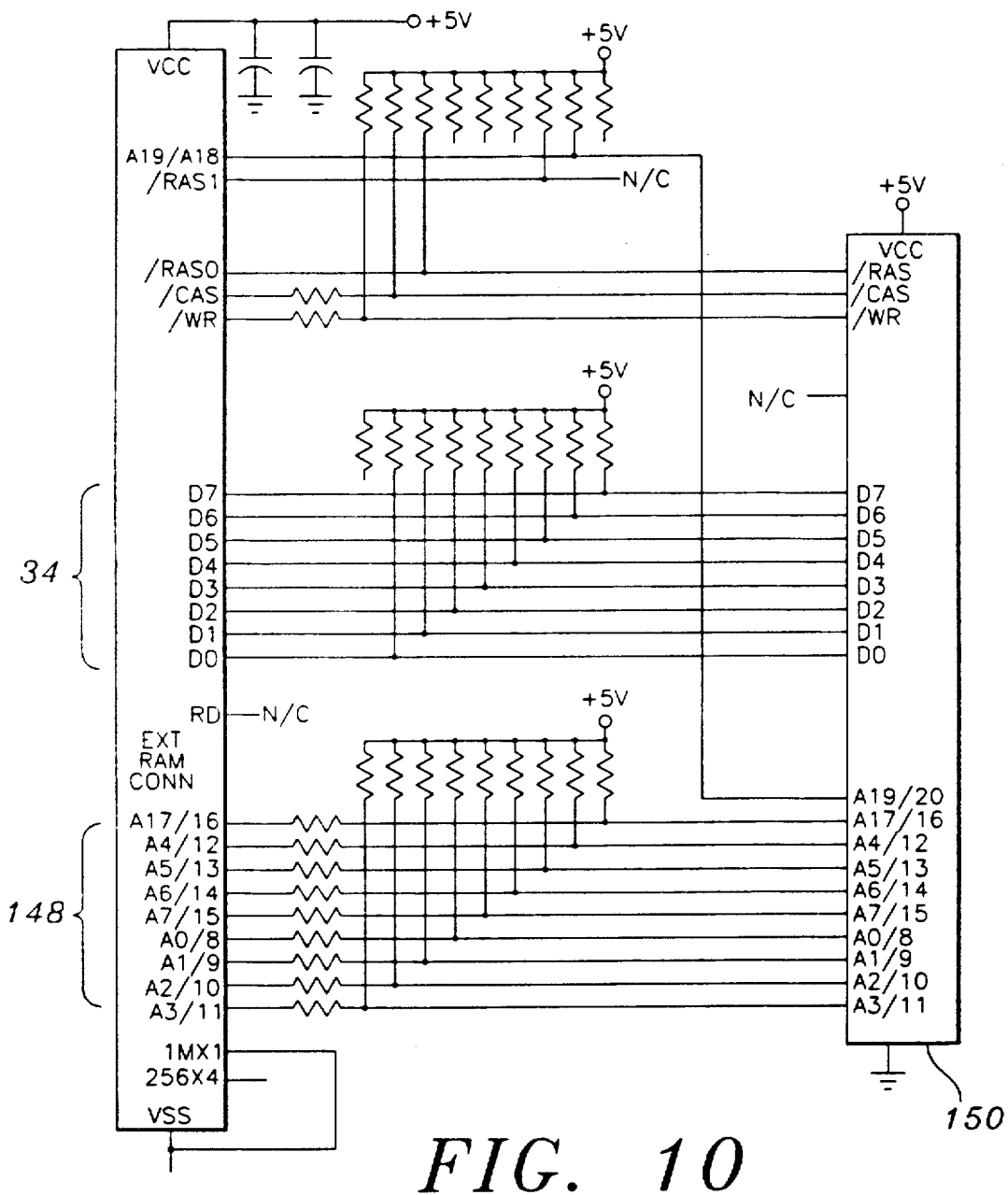
FIG. 10 is a schematic portion of the diagram showing an alternative memory extension utilized in connection with the circuitry of FIGS. 1-7.

Multiplexing address bits to the memories described in FIGS. 9 or 10 is controlled through D type flip-flop 76, clocked by the signal clock according to the control signal /RAM, which is an active low random access memory address selection signal, generated by PAL 70.

Figure 5:
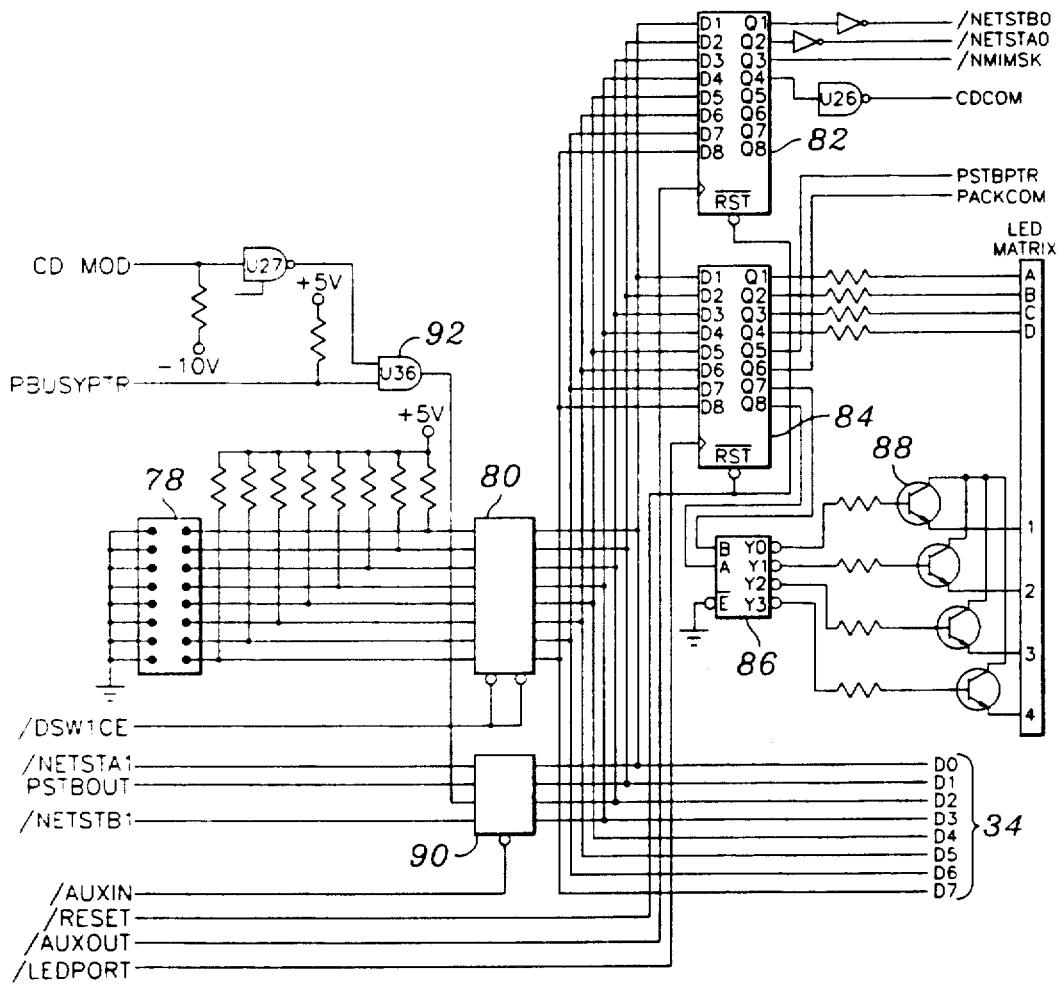
FIG. 5 is a schematic of a portion of the diagram relating to identification, LED output and handshake functions.

FIG. 5 is a schematic of another portion of the circuitry. FIG. 5 illustrates the dip switch 78 in which the identification number is manually set, which uniquely identifies the controller to which the circuitry of FIGS. 2-10 correspond. The setting of the dip switch is coupled through a tristate bus driver 80 to data bus 34. Bus driver 80 is enabled or activated by /DSW1CE, an active low dip switch 1 port chip enable.

Data on data bus 34, including the ID number from bus driver 80, can be loaded into latches 82 and 84. Latch 82 is clocked by the signal AUXOUT, which is auxiliary output port chip enable. The Q1-Q4 outputs of latch 82 are respectively /NETSTBO, active low network STATUS B output, /NETSTAO, the network status active A output, /NMIMSK, an active low nonmaskable interrupt mask, and CDCOM, an RS232C active high carrier detect signal provided to the computer. These include various ones of the network signals through which the log-on/log-off procedure is implemented as described above.

Latch 84 in turn is enabled by /LEDPORT, an active low enable signal for the light admitting diode outputs. The Q1-Q4 outputs are the first four inputs to an LED matrix. The Q5 and Q6 outputs of latch 84 in turn are the discrete command signals PSTBPTR, an active high parallel strobe to the printer and PACKCOM, an active high parallel acknowledge signal provided to the computer.

The Q7 and Q8 outputs of latch 84 in turn are provided as the B and A inputs respectively of encoder 86. The four-bit output of encoder 86 is provided to the bases of a corresponding plurality of output driver transistors 88 whose collectors provide the LED drive signals 5-8 to an LED board included within each controller.

Access to data bus 34 is also provided through tristate controller 90, which is enabled by /AUXIN, an active low auxiliary input port chip enable. The inputs to controller 90 are in turn the discrete command signals /NETSTAI, the active low network STATUS A input, and /NETSTBI, the active low network STATUS B input. A third input is PSTBOUT, an active high parallel strobe output to printer status signal. A fourth input to controller 90 is provided through gate 92. The inputs to gate 92 include PBUSYPTR, which is an active high parallel busy signal from the printer, and a buffered output of CD MOD, an RS232C active high carrier detect signal from a modem.

Turn now to FIG. 6 which illustrates various switching connections made through the controller. The controller can be configured either as a serial or parallel device to its corresponding input device or computer, and independently configured as a serial or parallel input device to its output device or printer depending on the manual position of switches 106 and 102 respectively.

Each network controller of the invention is provided with an input connector 94 which is connected to the "input" device or computer. The data pins of connector 94 are coupled to a tristate controller 96, whose output in turn is coupled directly to a tristate latch 98. The output of tristate latch 98 in turn is coupled to data bus 34. Data bus 34 is also coupled to latch 100. The data inputs to latch 100 are derived also ultimately derived from parallel output connector 104 typically connected to the "output" device or printer, modem, plotter or like coupled to the controller.

Four of the inputs to latch 96 are derived from a serial to parallel switch 106 and four inputs to latch 100 are coupled to switch 102. Switch 106 is coupled to input connector 94 and a plurality of discrete command signals which have been discussed above, as shown in FIG. 6. Similarly, a number of discrete command signals are also coupled to switch 102, as discussed above. Among those discrete command signals coupled to serial/parallel switch 106 are DTRCOM, and RS232C active high data terminal ready request to the computer signal, DXDCOM is an RS232 active high transmitted data to the computer, RXDCOM is an RS232 active high received data from the computer.

PACKCOM is coupled to a an inverter to connector 94 to become the /ACK signal PACKCOM is an active high parallel acknowledge to the computer which appears on the input connector 94 as an active high signal, indicating data has been received by a parallel data port. PSTBPTR, an active high parallel strobe to printer signal is coupled to switch 102. Also coupled to switch 102 is DTRPTR, an RS232C active high data terminal ready request from the printer. PSTBIN is an active high parallel strobe input from computer status which is drawn from one of the input pins of connector 94.

A D type flip-flop 108 is clocked by output from serial/parallel switch 106 to provide its Q output buffered as the busy signal on input connector 94 when switch 106 is positioned to the parallel position. The /Q output of flip-flop 108 is provided as a /PINT signal in the lower right hand corner of FIG. 6, which is an active low parallel data interrupt. The signal/STB is an active low parallel strobe signal from the computer. It is coupled to the clock input of flip-flop 108 when switched to the parallel position. The strobe,/STB, to the output device is derived from PSTBOUT from microprocessor program control.

Figure 7:
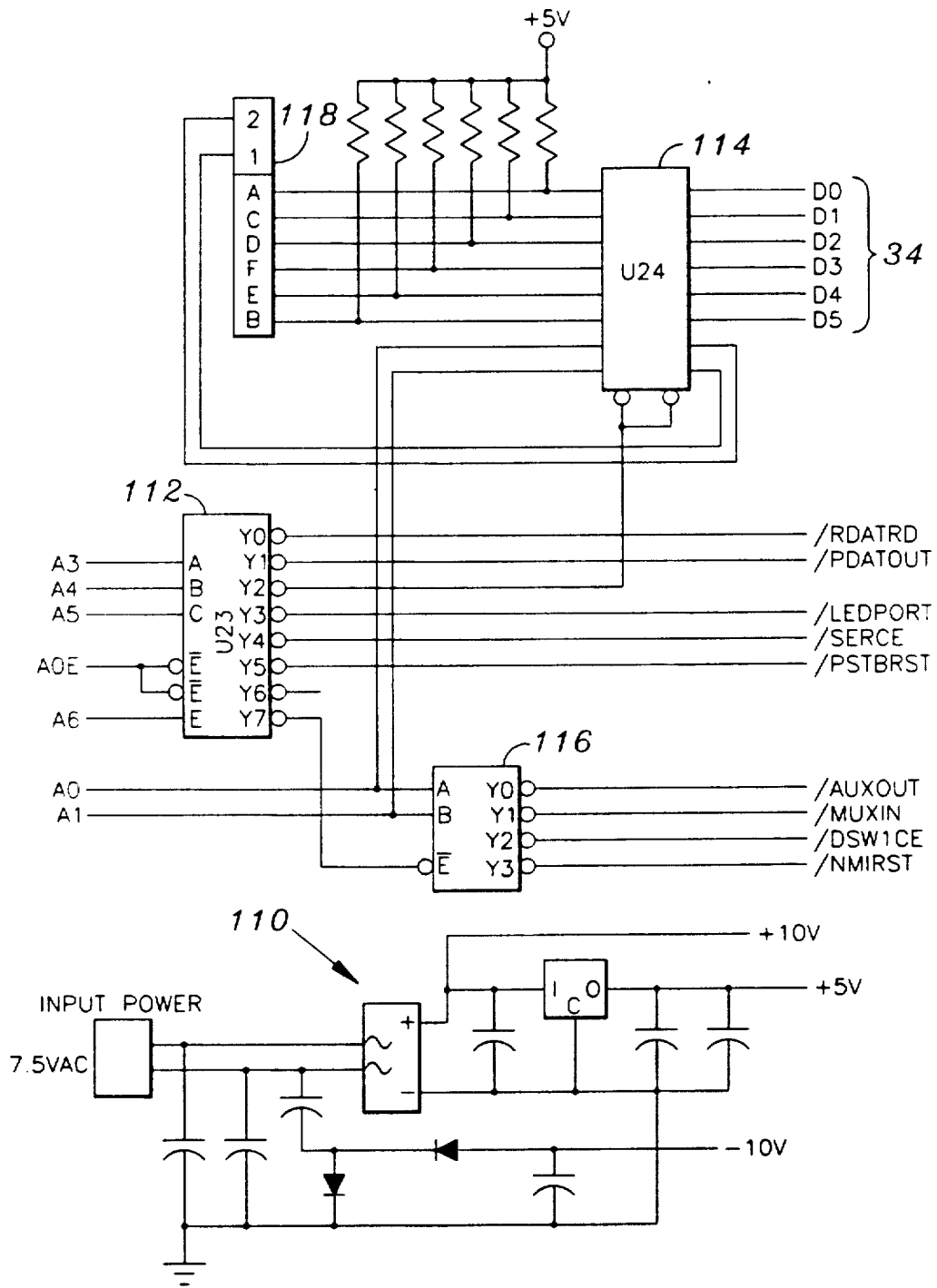
FIG. 7 is a schematic diagram relating to keyboard signals and certain discrete command signals.

FIG. 7 illustrates some decoder circuitry and controller circuitry together with the 5-volt power regulator. The 5-volt power regulator, generally denoted by reference number 110 is shown in the bottom portion of FIG. 7 and is entirely conventional. Certain ones of the address bits, namely A3-A6 and /IOE, the active low processor input/output enable control signal, are provided as inputs to a 3-to-8 112. The output of decoder 112 provides enabling signals to tristate controller 114 and various discrete command signals shown on the left hand side of FIG. 7. Namely, these command signals include /PDATRD, which is an active low to enable print data to be read from an input latch, and /PDATOUT, an active low right parallel data to output latch signal. /LEDPORT is an active low enabling signal for an LED port to be written. /SERCE is the serial chip enable input encoder 60 in FIG. 3. /PSTBRST is an active low parallel output strobe reset.

A 2-to-4 decoder 116 is provided with the address inputs A0 and A1. Its four outputs are the discrete command signals /AUXOUT, which is an auxiliary output port chip enable; /AUXIN, the auxiliary input port chip enable; /DSW1CE, the dip switch 1 port chip enable; and /NMRST, a nonmaskable interrupt reset, the use of which has been discussed above.

Push buttons on the controller are coupled to a keyboard connector 18. The keyboard activations are provided as inputs to a tristate bus driver 114, whose outputs are coupled to data bus 34.

Figure 8:
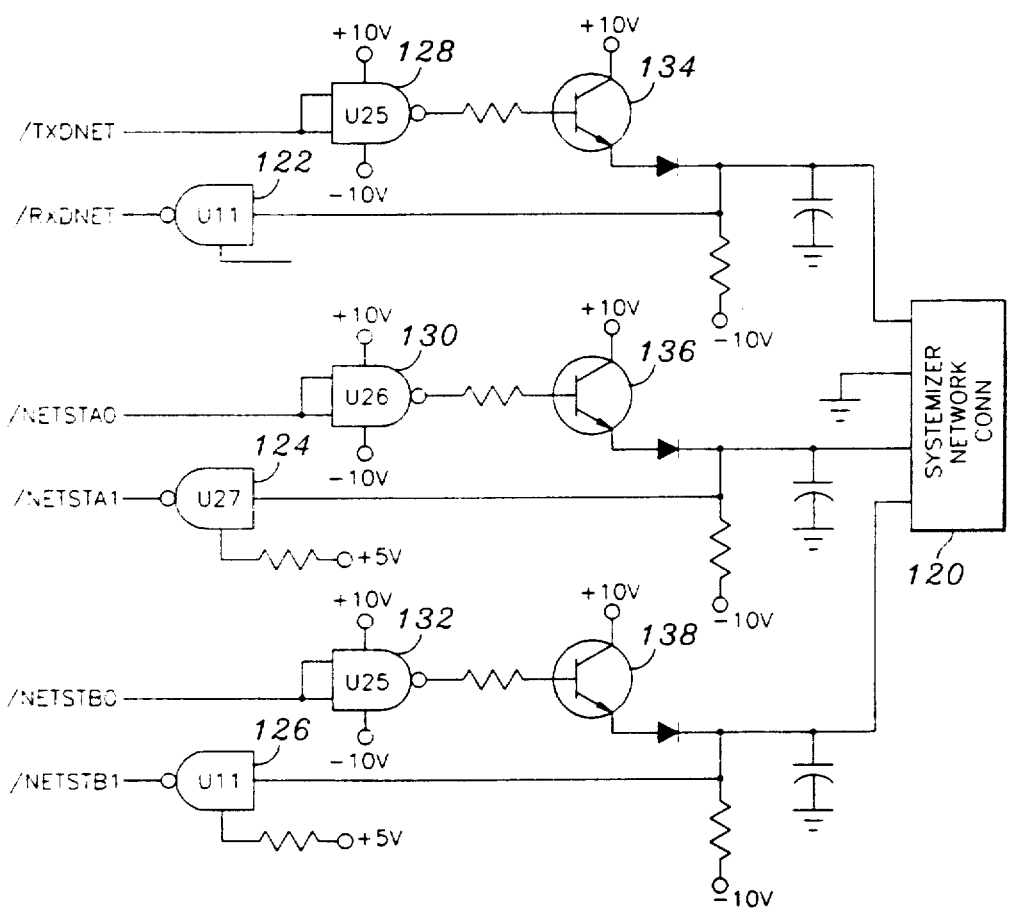
FIG. 8 is a schematic diagram showing circuitry related to Ttl to RS232C signal level transformation.

The schematic of FIG. 8 illustrates the circuitry used to convert the signals from TTL to RS232 drivers and from RS232 to TTL receivers. RS232 signals are provided through network jack 120. These signals are each in turn buffered appropriately through gates 122-126 to produce the discrete command signals /RXDNET, /NETSTAI, and /NETSTBI, discussed above. Similarly, discrete command signals /TDXDNET, /NETSTAO, and /NETSTBO are provided as output signals through buffers 128-132, respectively, and transistor drivers 134-138, respectively, to network connector 120. FIG. 9 is a schematic on a memory extension board which may be included or mounted on the main board within each controller. The circuitry of FIG. 9 represents a memory expansion for either 256K, 512K, or 768K of additional controller memory. Three banks of RAMS, 140-144, are provided, each of which may be either 64K or 256K RAMS. Connector 146 couples data bus 34 to each of the RAMS 140-144 as is multiplexed address bus 148. Memory control signals, /RAS0-2 and /CAS and /WR are similarly provided through connector 146 for conventional memory control functions.

FIG. 10 illustrates a 1 megabyte expansion board which uses 1 megabyte by 1 bit DRAM chips, which may be used instead of the 256K RAM 66 of FIG. 4 provided on the main board of the network controller FIG. 10 illustrates a DRAM memory 150 coupled to data bus 34 and multiplexed address bus 148, together with the appropriate memory control signals /RAS0-2, /CAS, and /WR. The operation of DRAM memory 150 is entirely conventional and, therefore, is not further discussed.

Turn now and consider the methodology in invention in greater detail as depicted in flow diagrams of FIGS. 11-24 which are provided as a particular improvement over the prior art. Consider a network session in which there is bidirectional communication between a computer coupled through the session sending network controller and the session receiving network controller coupled to an object device, such as a printer, modem, or another computer.

Figure 11:
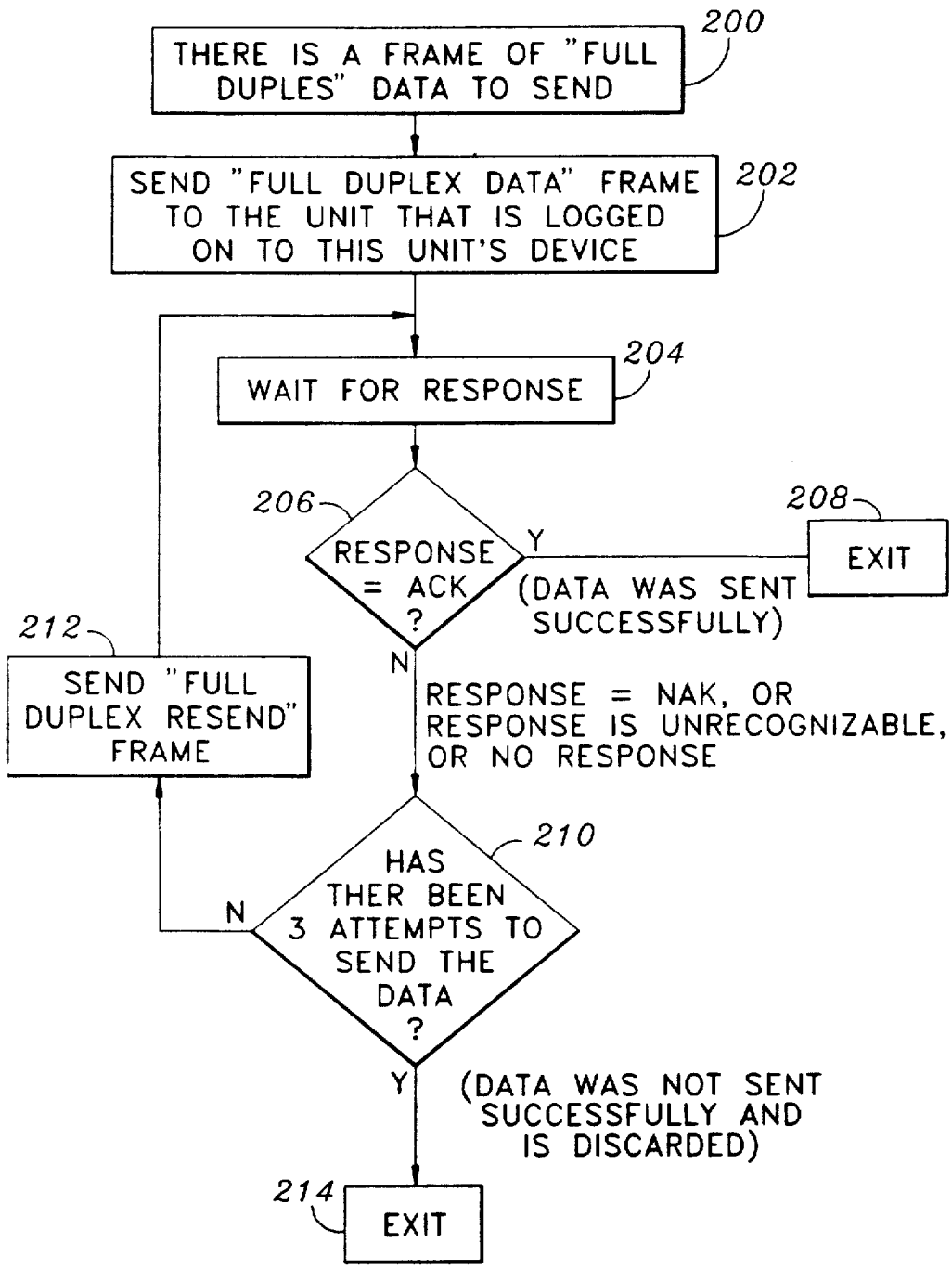
FIG. 11 is a flow chart of the methodology wherein full duplex data is transmitted on the network.

FIG. 11 is a flow diagram which illustrates the sending of full duplex data and in particular the portion of the methodology which is executed when there is a frame of data received from the network sessions receiver controller and the data is sent to the network sessions sending controller. In step 200 an indication is provided that is a frame of full duplex data to be sent to the sessions sender. In step 202 the full duplex data frame is sent to the sending controller which is logged on to the object device coupled to the receiving network controller. The receiving controller waits for a response in step 204. If an acknowledgement is received, as determined at step 206, it exits at step 208. Otherwise, execution continues to step 210.

At step 210 a determination is made whether three attempts have been made to send the data. If not, a second attempt to send the full duplex of data frame is implemented at step 212 with methodology returning to the wait step 204.

However, if the determination is made that three attempts have been made to send the data, the routine is exited at step 214. At that pint the data has not been sent successfully and it is discarded.

Turn now to a computer transfer which is illustrated in the flow diagrams of FIGS. 12-15. The computer-to-computer transfer allows a network sending controller to log-on to an input device, such as a computer, of a network receiving controller. This causes the network receiving controller i turn to log-on to the input device or computer of the network sending controller, forming a bidirectional computer-to-computer link.

Figure 12:
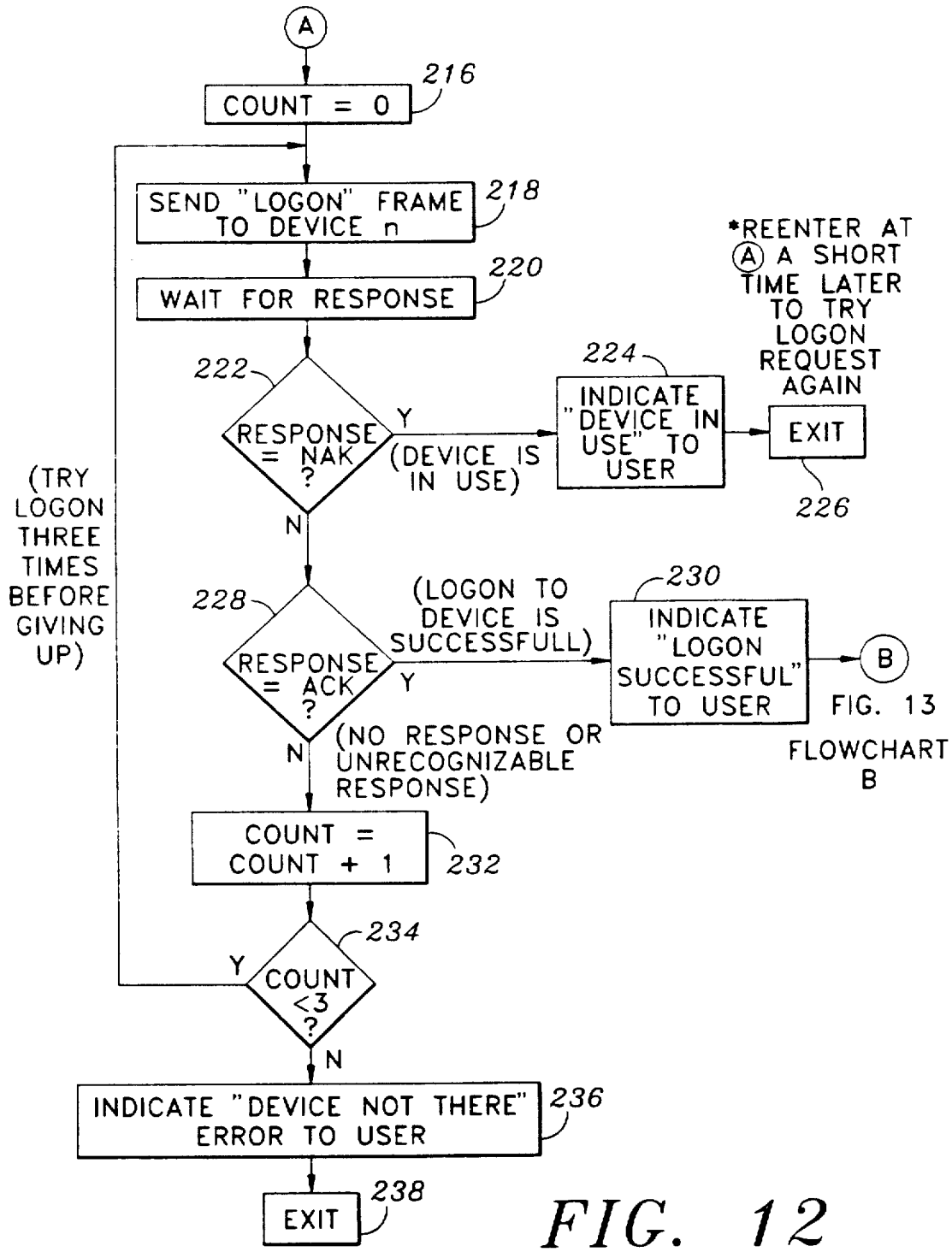
FIG. 12 is a flow chart of the methodology wherein a log on request is performed.

The log-on request is illustrated in FIG. 12. A counter is set to 0 at step 216 and a log-on frame is sent to the input device or computer at step 218. The sending controller waits for a response at step 220. If an NAK response is received, as determined at step 222, an indication is generated to the user to show that the requested device is in use at step 224. The routine is exited at step 226, with re-entry to try to log-on at a later time. If a response is acknowledged, as determined at step 228, indication to the user is made that a successful log-on has been accomplished at step 230 and processing continues, as depicted in FIG. 13.

If no response or an unrecognizable response is obtained, the count is incremented at step 232. If the count is less than three, as determined at step 234, the routine returns to step 218. If the count exceeds three, an indication is made to the user that the device is not on line at step 236, and the routine is exited at step 238.

Figure 13:
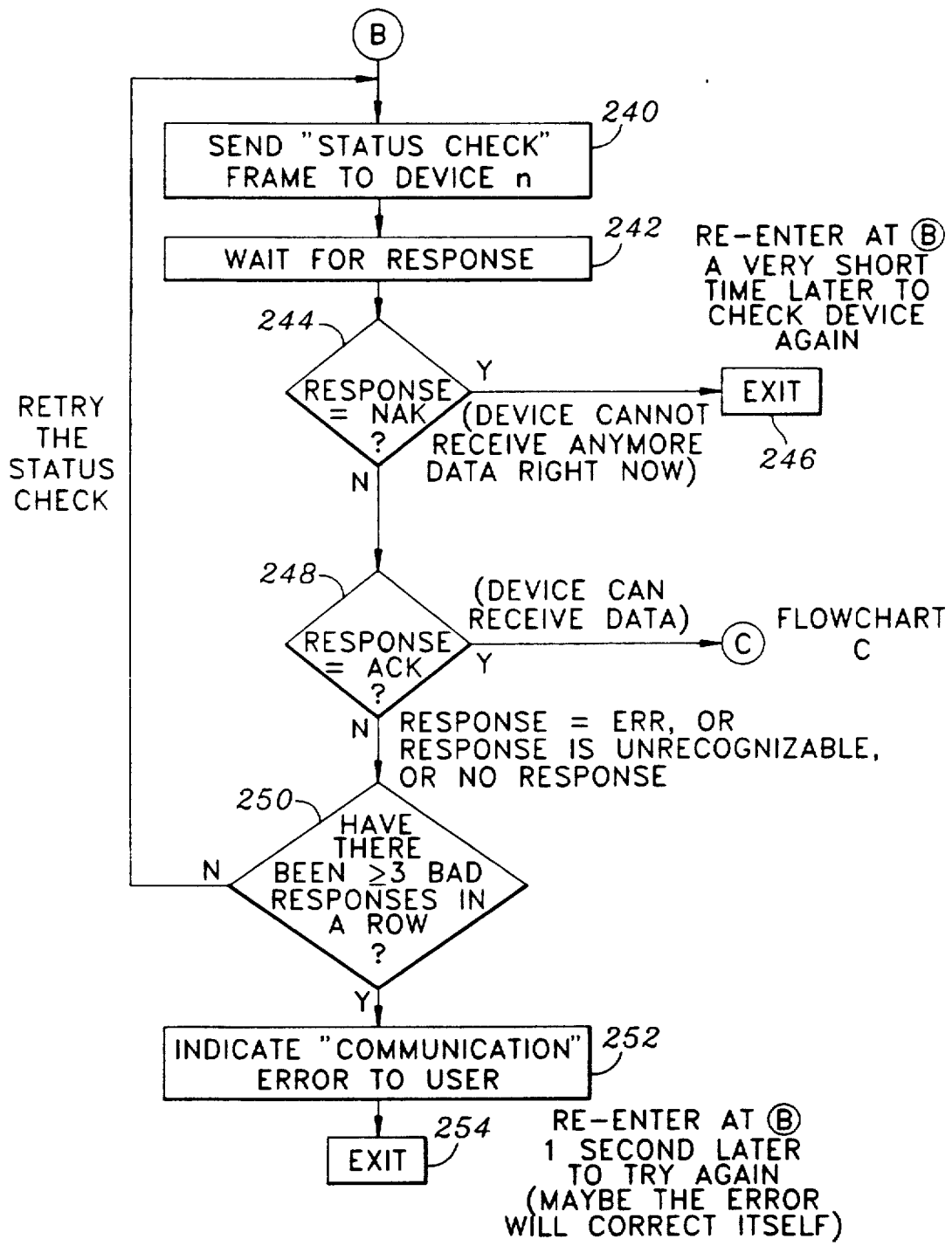
FIG. 13 is a flow chart of the methodology wherein a status check is performed.
Figure 14:
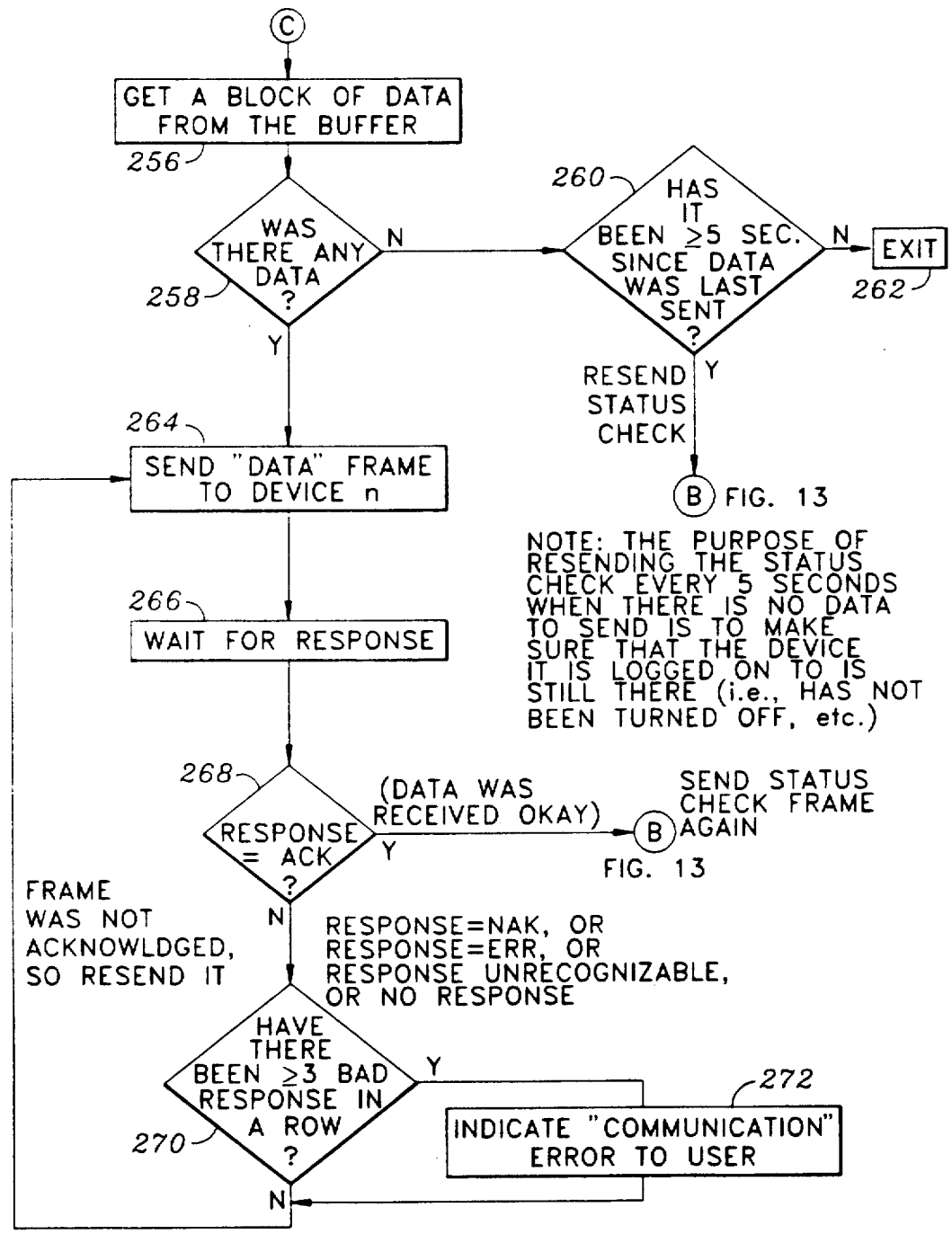
FIG. 14 is a flow chart of the methodology wherein data is transmitted on the network.

Turn now to FIGS. 13 and 14, wherein the routine for sending data to the input device or computer is illustrated. A status-check frame of the requested input device or computer is executed at step 240, for which a response is awaited at step 242. The nonacknowledgement response is received, as determined at step 244, indicating that the target or object computer cannot receive any more data, and the routine is exited at step 246. If an acknowledgement response is received, as determined at step 248, indicating that the device can receive more data, the routine continues with the methodology illustrated in FIG. 14. If no acknowledgement signal is received, it is assumed that there is an error. If there have been three or more back responses in a row, as determined at step 250, an error indication is generated to the user at step 252, and the routine exited at step 254. If three error responses have not been received in a row, as determined at step 250, the routine returns to step 240.

Turn now to FIG. 14. If the object device or input computer can receive more data, a block of data is retrieved from the controller memory of the sending network controller at step 256. If there is no data in the controller memory of the sending network controller, as determined at step 258, determination is then made whether there has been five seconds or more since the last data was sent at step 260. If this determination is affirmative, processing then continues with step 240 in FIG. 13. However, if the determination in step 260 is negative, the routine exits at step 262, to be re-entered a short time later to check for data again.

if there was data within the buffer memory within the sending network controller, as determined at step 258, a data frame is sent to the input computer at step 264. Response is awaited at step 266. If acknowledgement is received, as determined at step 268, it is understood that the data was received and the routine continues with step 240 in FIG. 13.

However, if no acknowledgement has been received, as determined in step 268, determination is made at step 270 whether or not three or more bad responses in a row have been received. If three or more bad responses have received, as determined at step 270, an indication is made to the user that an error occurs at step 272. In either case, the routine returns to step 264 to send the next data frame.

Figure 15:
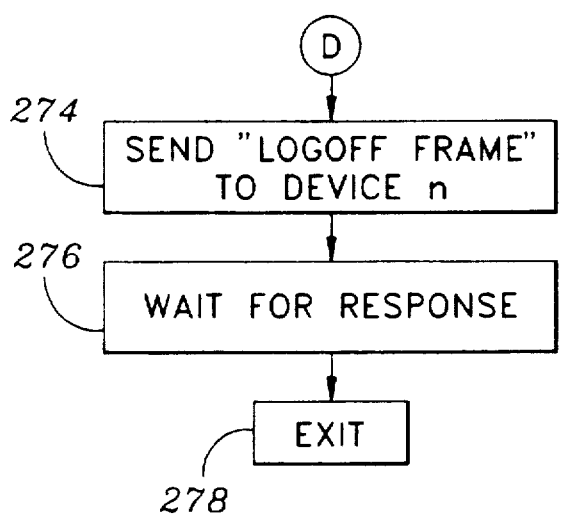
FIG. 15 is a flow chart of the methodology wherein a logoff request is performed.

After all the data has been sent, a log-off frame is sent to the corresponding network controller of the input computer at step 274, as depicted in FIG. 15. Response is awaited at 276, and thereafter the routine exits at step 278. Response is normally an acknowledgement, ACK. However, even if no response is received or the response is unrecognizable, the log-off is considered complete by the network controller sending the log-off command.

Turn now to another improve of the methodology invention wherein a network session autoscan is performed. In prior art network systems, an auto log-on was provided to provide a predetermined ID number for the network controller. If the network controller received data from the computer and the user had not manually logged-on to a device, the network controller would then automatically log-on to the auto log-on ID.

In the present invention, the user may specify an autoscan list of ID's. If the network controller receives data from a computer and the user has not manually logged-on to the device, the network controller will scan the network looking for the first device in the autoscan list that is available, that is, one that is not in use by another user. Scanning continues indefinitely until a free device is found.

Figure 16:
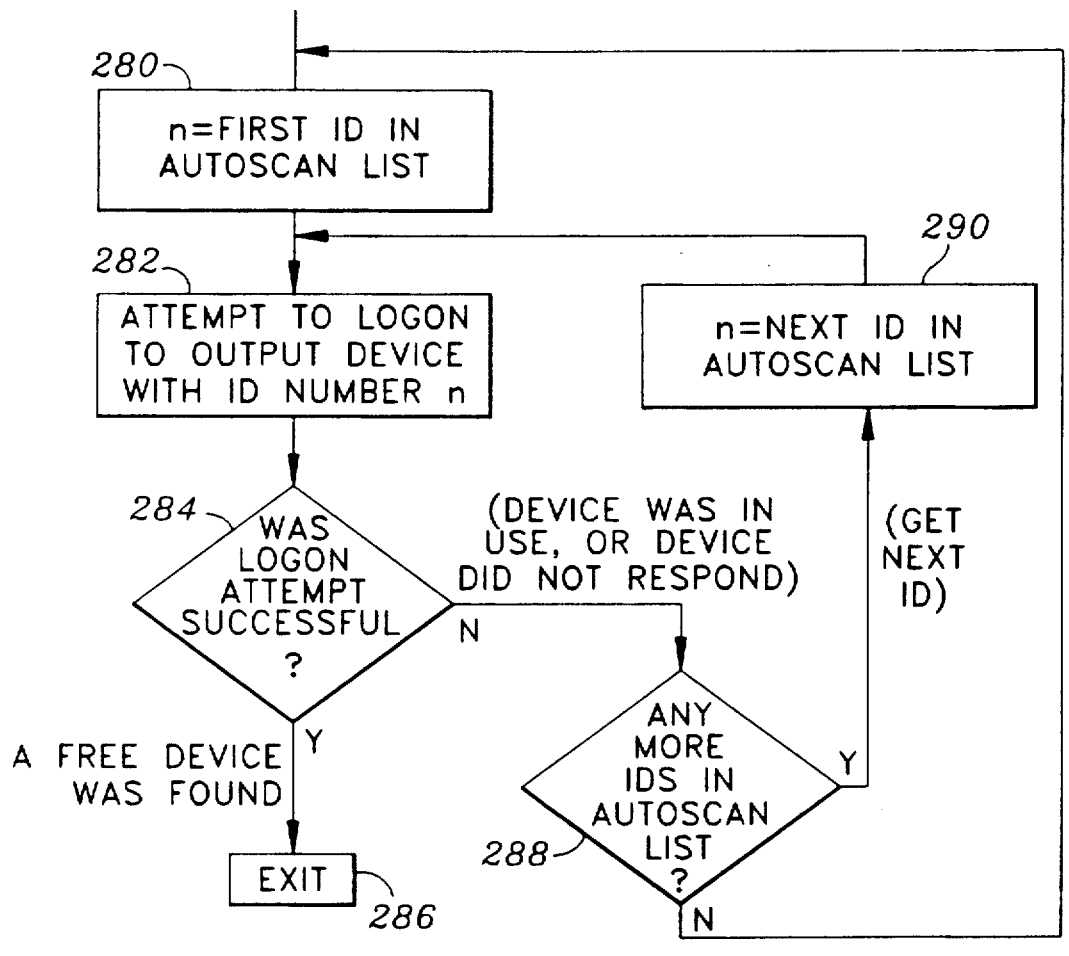
FIG. 16 is a flow chart of the methodology wherein am autoscan is performed from an autoscan list.

Turn not to FIG. 16 wherein this methodology is implemented. In step 280, a first ID in the autoscan list is selected. A log-on is attempted in step 282 to log-on the output device with the ID number selected in step 280. If the log-on was successful, as determined in step 284, the routine is then exited at step 286. However, if the log-on was unsuccessful, a determination is then made at step 288 whether there are any more ID's in the autoscan list. If there are, the next ID in the autoscan list is selected at step 290, and the routine continues with an attempted log-on at 282.

however, if there are no more ID's in the autoscan list, as determined at step 288, execution of the routine returns to step 280. This is indicative that no free devices were found, so that the scanning routine continues again. This routine continues indefinitely until exiting through step 286.

Figure 17:
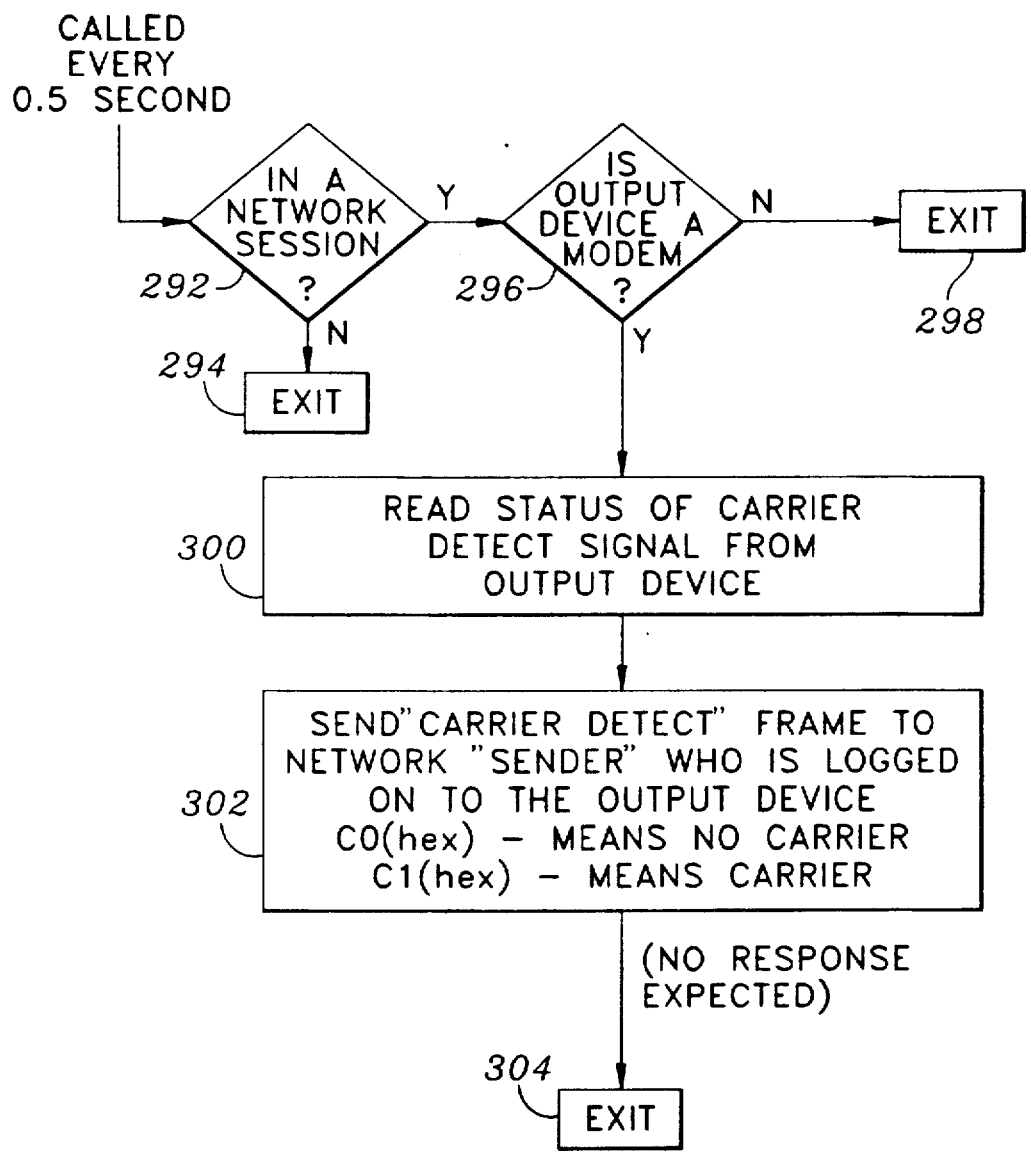
FIG. 17 is a flow chart of the methodology wherein a carrier detect is transmitted on the network.

Turn now to the methodology as depicted in FIG. 17, wherein a transmission of a carrier detect signal over the network for modem sharing is illustrated. In this embodiment to the methodology the object device is a modem attached to the session receiver. When a user logs-on to the receiver connected to the modem, the session receiver will read the carrier detect signal from the modem every 0.5 seconds and send its status over the network. The network controller which is logged onto the modem, namely the session sender, will send its carrier detect signal to the computer according to the carrier detect status frames it receives over the network. The routine of FIG. 17 is called every 0.5 seconds through a heartbeat interrupt. In step 292 a determination is made whether the software routine is in a network session. If not, the routine is exited at step 294. Otherwise, a determination is then made at step 296 of whether the output device in question is a modem. If not, the routine is exited at step 298.

If it is determined at step 296 that the output device is a modem, the status of the carrier detect signal is read from the output device from modem at step 300. A carrier detect frame is sent to the network sender which is logged onto the modem with a signal indicating that there is or is not a carrier at step 302. After the carrier detect frame is sent, the routine is exited at step 304, since no response is expected.

Figure 18:
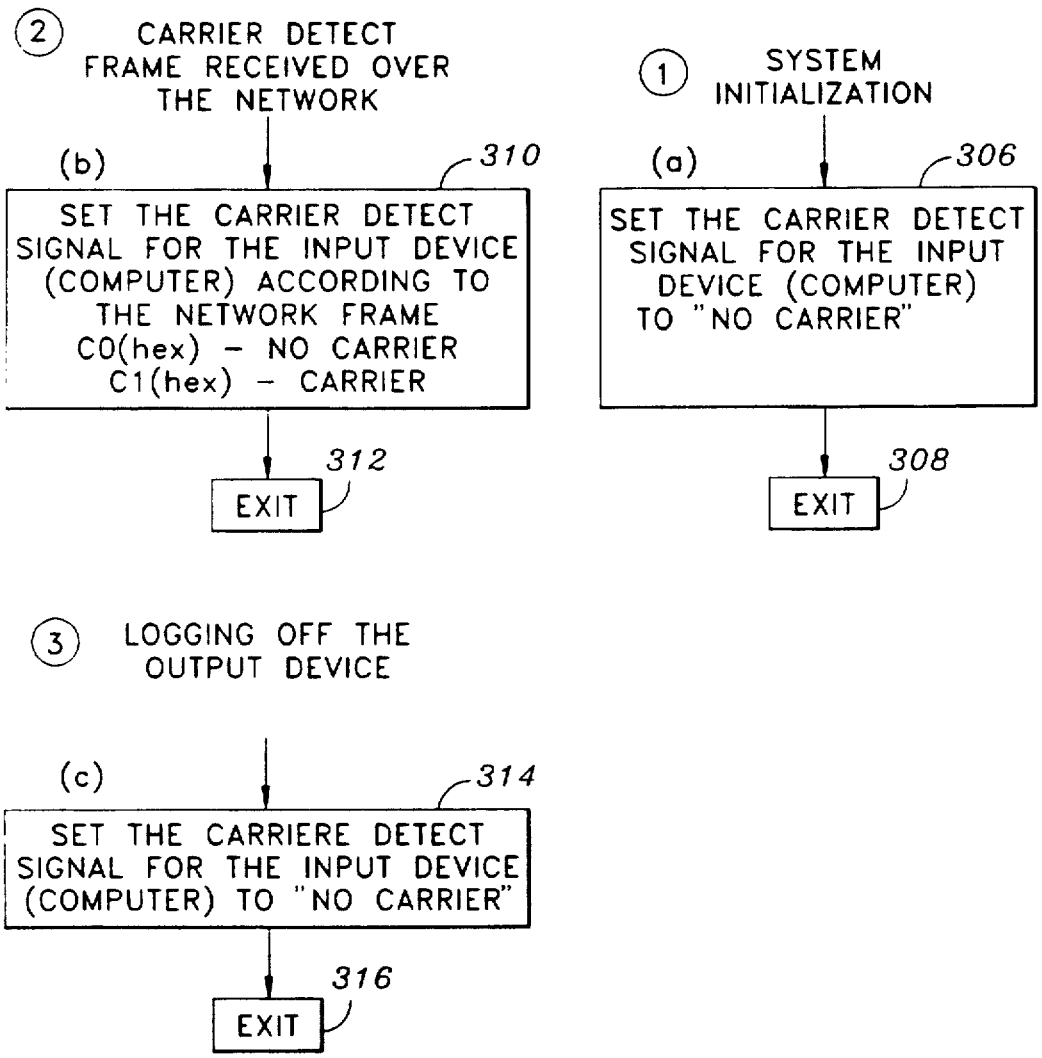
FIGS. 18a-c are flow charts of the methodology wherein a carrier detect is performed by the sending controller.

FIG. 18 illustrates the role of the network session sender in setting the status of the carrier detect signal at the input device connector. The carrier detect signal going to the computer is initially set to a "no carrier" indication. During the network session, the carrier detect signal going to the computer is set according to the carrier detect status frames received over the network. When a session is terminated, the carrier detect signal is again reset to "no carrier."

More particularly in FIG. 18A, on system initialization, the carrier detect signal for the input device is set to no carrier at step 306 and then thereafter exited at step 308. When a carrier detect frame is received over the network, as shown in FIG. 18B, the carrier detect signal is set for the input device or computer, according to the network frame data at step 310 and exited at step 312. After the session is terminated, when logging off the output device or modem, as shown in FIG. 18C, the carrier detect signal is once again set to no carrier condition at step 314 and exited at step 316.

Turn now to the aspect of the methodology wherein the transmission of a "device off line" status is provided over the network. Here, the session receiver network controller constantly monitors the off-line or busy status of the output device. If the device is off line, the session receiver sends a device off-line frame every 2.5 seconds to the session sender. If the device is not off line, the session receiver does not send any device off-line frames, so that the absence of any device off-line frames is interpreted as an on-line status condition.

When the session sender receives a device off-line frame, it notifies its user or computer that the device is off line and sets a timer for three seconds. If the timer expires without receipt of an additional off-line frame, the session sender assumes the device is back on line and indicates the same to the user.

Figure 19:
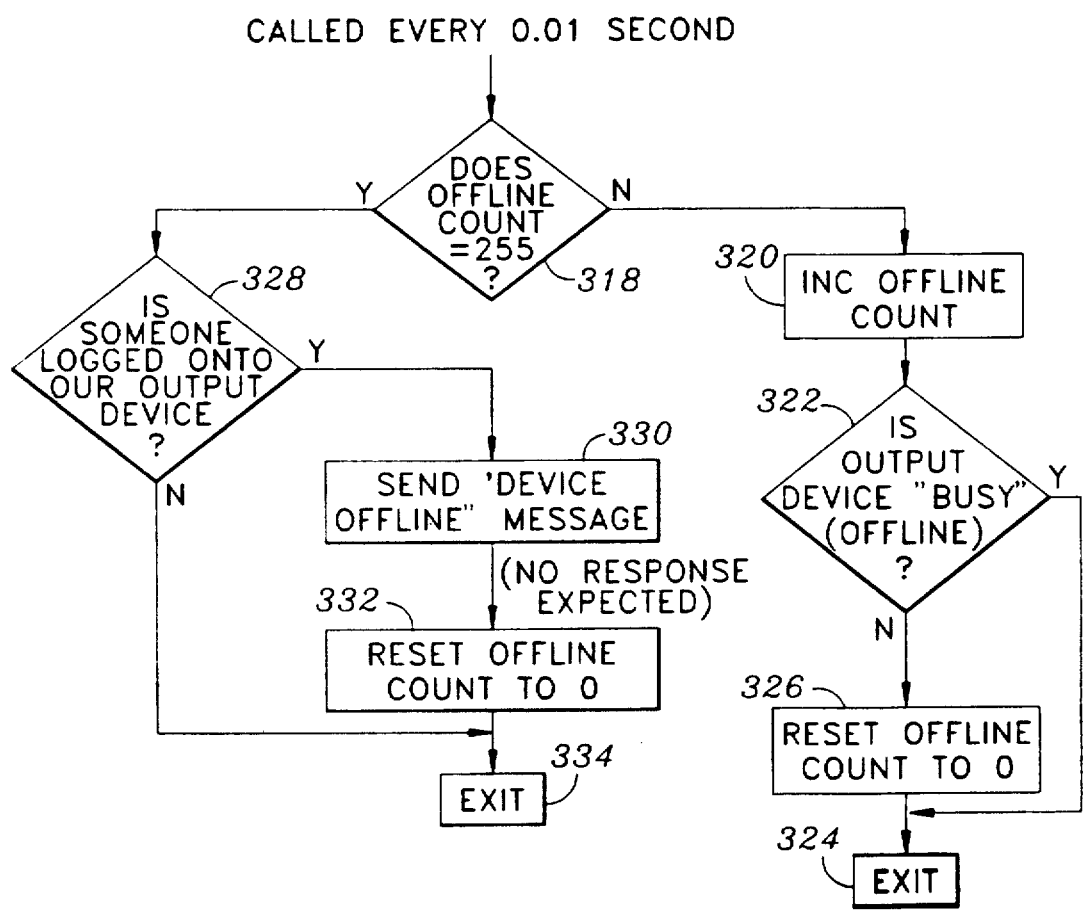
FIG. 19 is a flow chart of the methodology wherein an off-line detect is transmitted on the network.
Figure 20:
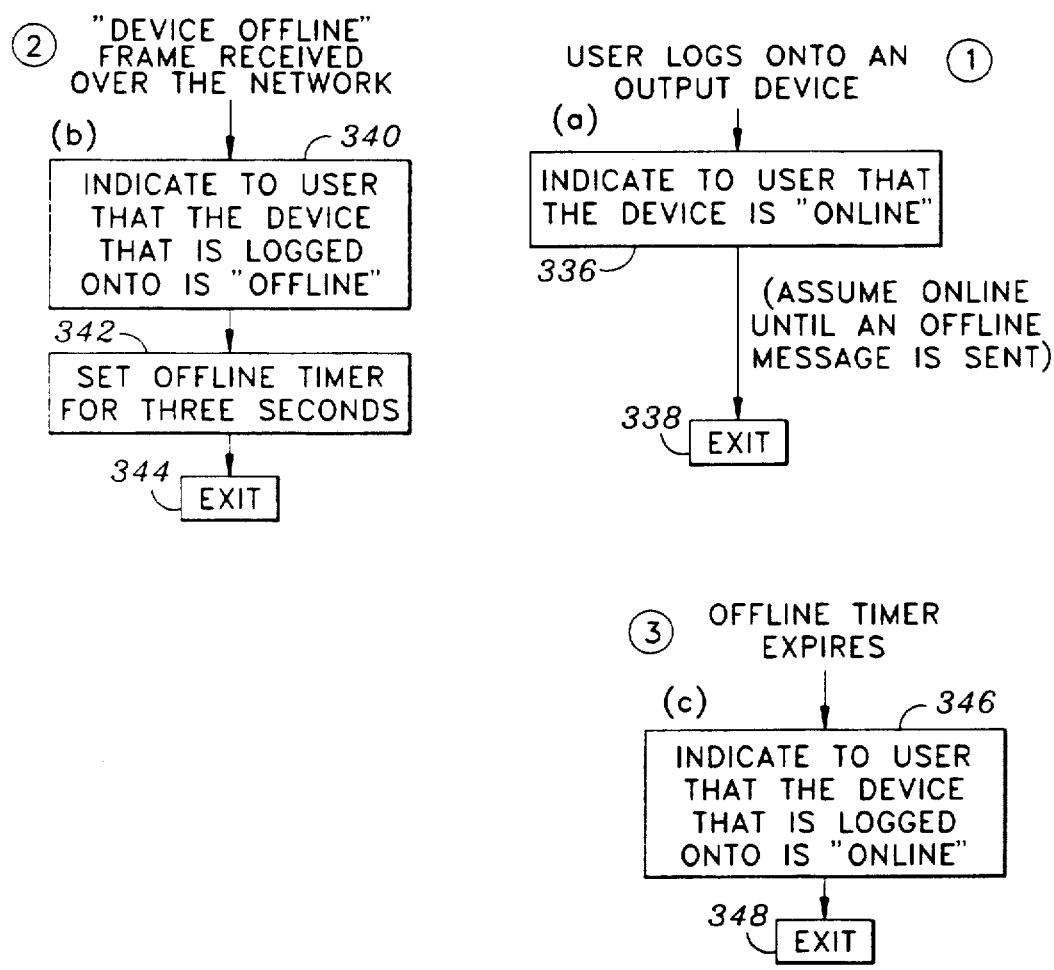
FIGS. 20a-c is a flow chart of the methodology of the sending controller wherein an off-line detect is transmitted on the network.

This methodology is depicted in detail in FIG. 19. The routine is called every 0.01 seconds to determine at step 318 whether an off-line count is equal to 255. If it not, the off-line count is incremented at step 320 and a determination made at step 322 whether the output device is busy or off line. If the output device is busy, the routine is exited at step 324. Otherwise, the off-line count is reset to 0 at step 326.

When the off-line count equals 255 at 2.55 seconds later, a determination is made at step 328 whether any network controller has attempted to log onto the output device. If an attempt to log-on has been made, the device off-line message is sent at step 330, and the off-line count is reset to 0 at step 332. If no attempt at log-on has been made, the routine is exited at step 334.

FIGS. 20A-C depict the role of the network session sender in receiving device off-line frames over the network and reporting the off-line status device to the user. In FIG. 20A when the user logs onto the output device, indication is made at step 336 that the device is on line. An assumption is made that the logged-on device is on line until an off-line message is sent. The routine is then exited at step 338.

If a device off-line frame is received over the network by the sender, an indication is then made to the user that the device to which an attempt is made to log onto is off line at step 340. An off-line timer is set for three seconds at step 342, and the routine is then exited at step 344. If the off-line timer expires, as shown in FIG. 20C, indication is made to the user that the device that is logged onto is on line at step 346, and the routine is exited at step 348.

Consider now the methodology that is implemented int he electronic mail sessions. One network controller, the mail sender, seizes another controller's mailbox, that is the mail receiver's mail box. The mail sender sends the mail message to the mail receiver. The mail sender releases the mail receiver's mail box.

Figure 21:
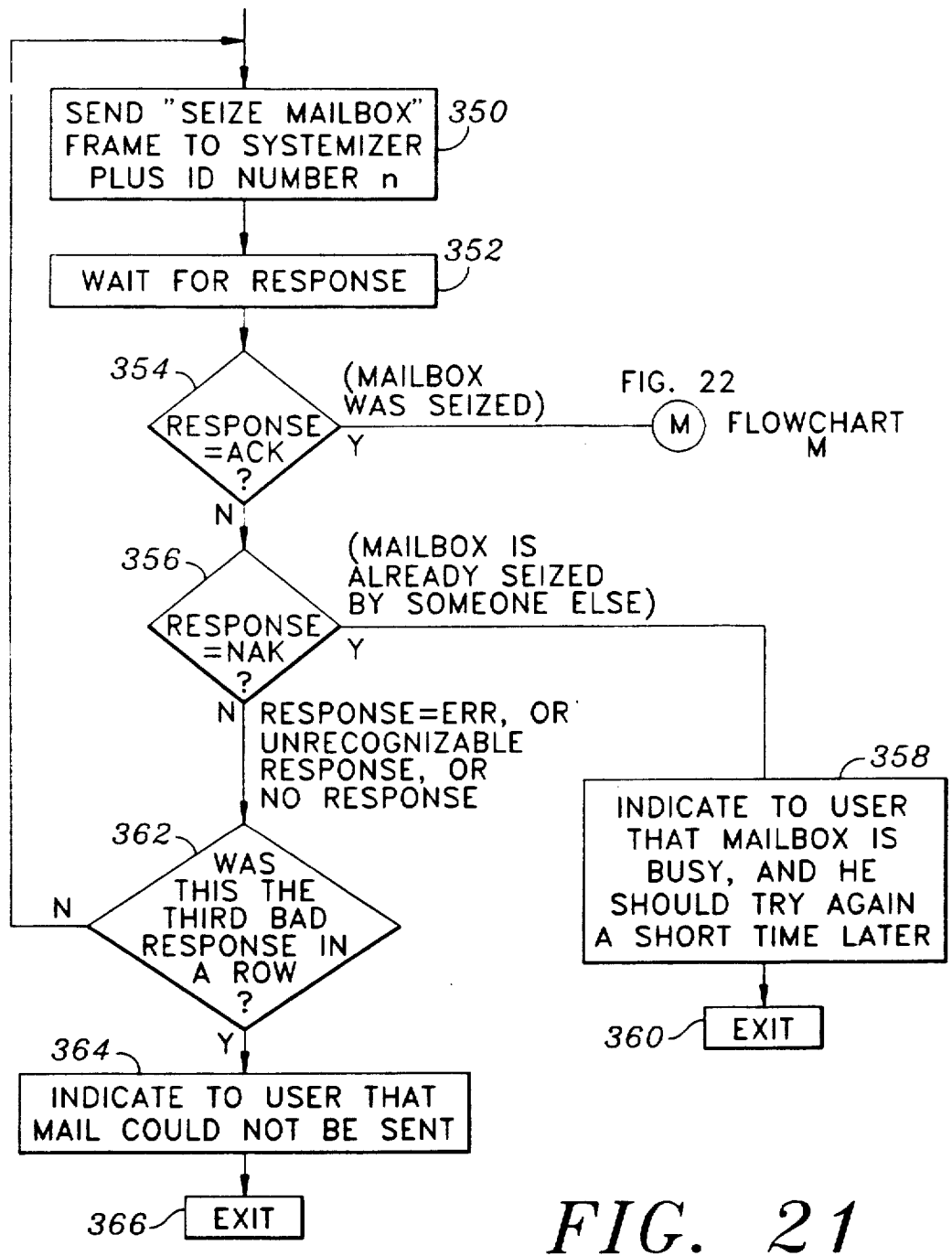
FIG. 21 is a flow chart of the methodology wherein an attempt to seize a mailbox is performed on the network.

FIG. 21 illustrates the flow diagram for the routine for seizing the mailbox. The user sends a mail message to his network controller and instructs the controller to deliver the message to an identified network controller with a different ID. A seize-mailbox frame is sent to the identified network controller at step 350. Response is awaited at step 352. If an acknowledgement, ACK, is received as determined at step 354, the routine continues with the methodology depicted in FIG. 22. If a nonacknowledgement is instead received as determined at step 356, an indication is then made to the user that the mail box is busy and that the sender will try again at a short time later at step 358, with the routine exiting at step 360.

If there is an error response, unrecognizable response, or no response at all, and three such bad responses were made in a row as determined at step 362, an indication is made to the user at step 364 that the mail could not be sent with an exit being made from the routine at step 366. If three such bad responses have not been received as determined at step 362, execution of the routine returns to step 350.

Figure 22:
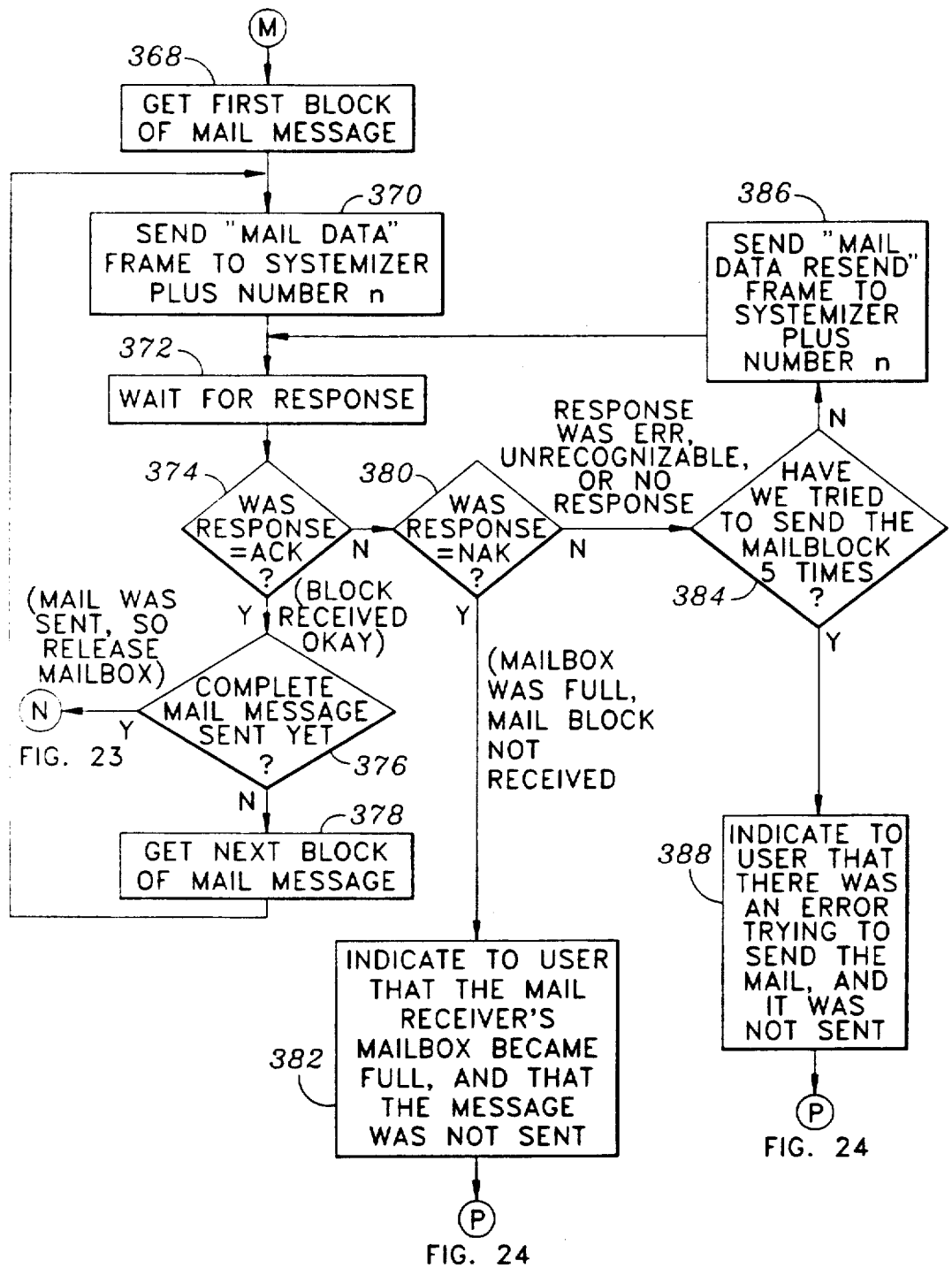
FIG. 22 is a flow chart of the methodology wherein a mail message is sent on the network.

Turning to FIG. 22, if an acknowledgement was received, the mailbox is considered seized and the mail message is sent by sending the first block of the mail message at step 368. A mail data frame is sent to the designated receiving network controller at step 370. Response is then awaited at step 372. If the response is an acknowledgement as determined at step 374, a determination is then made whether the complete mail message was sent at step 376. If the complete message has been sent, then the execution continues with the methodology depicted in FIG. 23.

If the complete message has not been sent, then the next block of the mail message is retrieved at step 378 and then sent as before at step 370. If no acknowledgement is received at step 374, a determination is then made at step 380 whether a nonacknowledgement was received. If a nonacknowledgement was received, this is indicative that the mailbox was full and the mail block was not received. Indication is then made at step 382 to the user that the mailbox became full and the message was not sent. Execution then continues with the methodology depicted in FIG. 24.

If an error response was received or the response was unrecognizable or there was no response, then a determination is made at step 384 whether five attempts have been made to sent the mail block. If five attempts have not been, the mail-data-resend frame is sent to the designated network receiving controller at step 386, with return of the execution to step 372.

If an attempt to send the mail message has been made five times, then an indication is made to the user at step 388 that there was an error in trying to send the mail and it was not sent. Execution continues thereafter and is depicted in FIG. 24.

Figure 23:
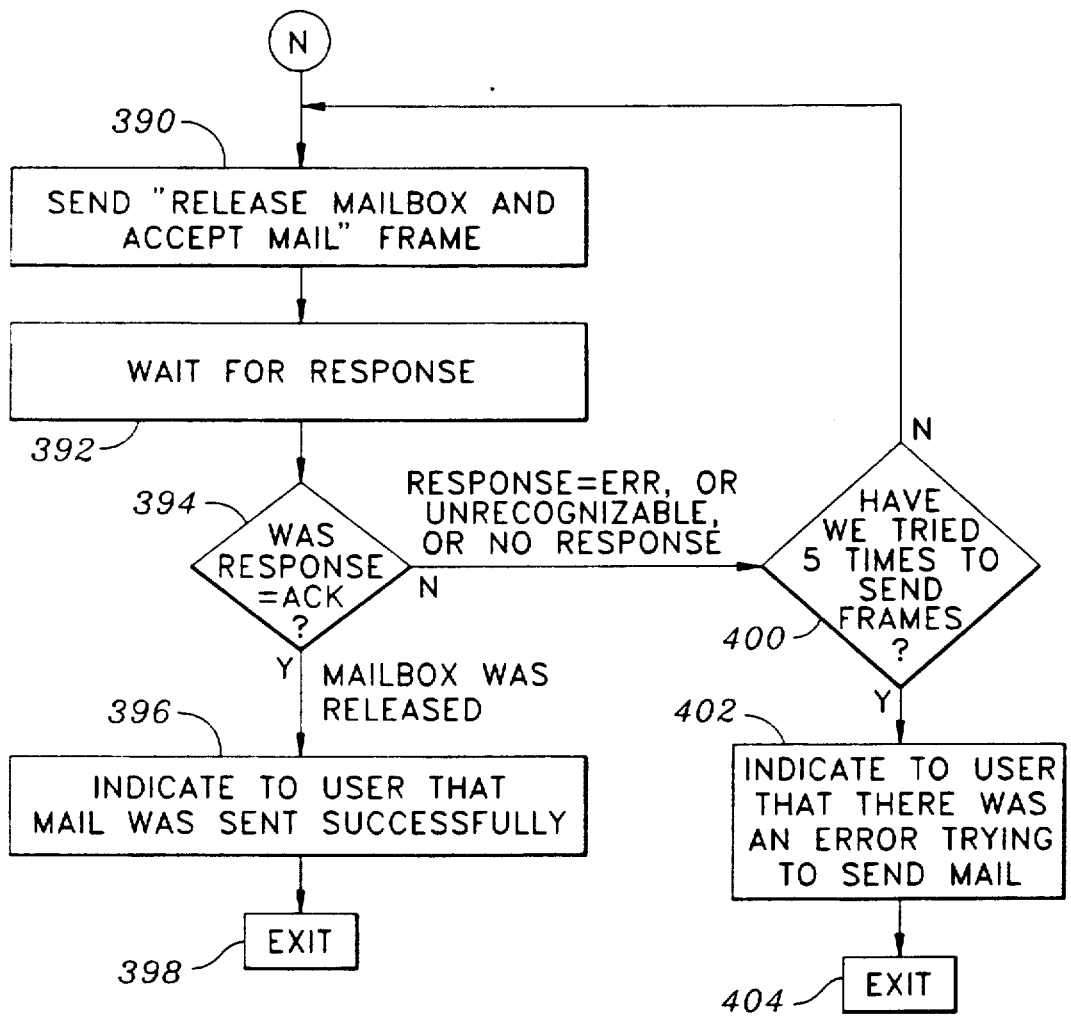
FIG. 23 is a flow chart of the methodology wherein a receiving controller releases its mailbox.

Turn now to FIG. 23, wherein a mail session receiver releases its mailbox and accepts the mail message that was sent. The methodology of claim 23 is executed when the complete-mail message has been successfully sent to the mail session receiver. A release-mailbox and accept-mail frame is sent by the mail session receiver at step 390 and response is then awaited at step 392. Again, an acknowledgement is determined at step 394. If acknowledgement was received, an indication is made to the user that the mail was successfully sent at step 396 and the routine exited at 398. If an error response, unrecognized response, or no response is received, a determination is then made at step 400 whether or not five attempts have been made to sent the release-mailbox and accept-mail frame. If not, execution returns to step 390.

If five attempts have been made, an indication is made to the user at step 402 that there was a error in trying to send the mail. The routine then exits at step 404.

Figure 24:
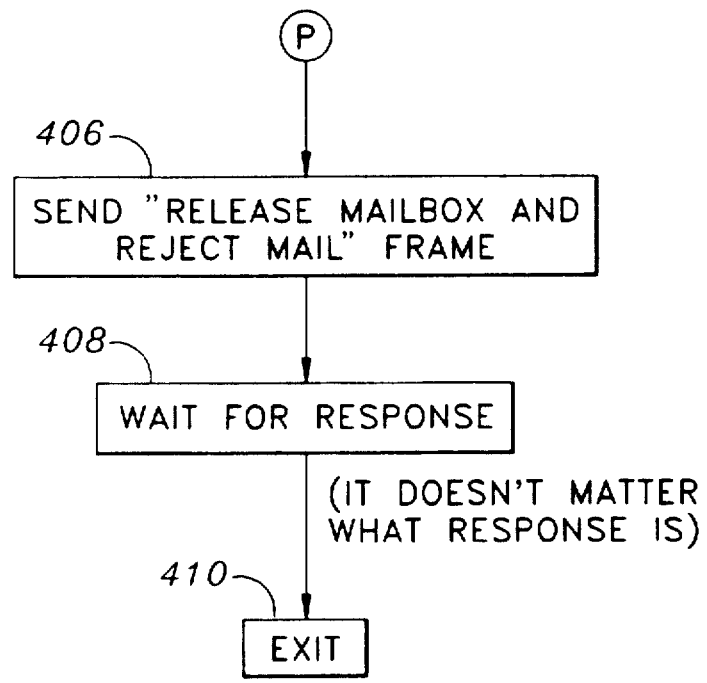
FIG. 24 is a flow chart of the methodology wherein a receiving controller releases and rejects the mail message.

FIG. 24 shows the methodology in which the mail session receiver releases its mailbox and rejects the mail message that was just sent. This methodology is executed when the mail session receiver indicates that the mailbox is full or when there is an error block trying to send the message. When this occurs, a release-mailbox and reject-mail frame is sent at step 406. Response is then awaited at step 408 and the routine exited at step 410, since the nature of the response is immaterial.

Many modifications and alterations may be made by those having ordinary skill in the art without departing from the spirit and scope of the invention. Therefore, the illustrated embodiment has been set forth only for the purposes of example and should not be taken as limiting the invention as defined in the following claims. The elements of the following claims and the claim as a whole must be read in light of the specification to include not only the illustrated embodiment, but all equivalents now known or later discovered.

APPENDIX 1

Following is the list of network frame IDs. Only a subset of these frame IDs are recognized by regular Systemizers.

The following frames are recognized by regular Systemizers as well as Systemizer Pluses.

a.

10 $h$—Status check of destination ID's output device.
18 $h$—Status check of destination ID's input device.
Meaning: This frame is used to tell whether the indicated device is able to receive a frame of data.
Response:
ACK—there is room for a frame of data in the device's buffer (which is large enough to double-buffer two frames).
NAK—there is not room for a frame of data.
ERR—the source ID is not logged on to the indicated device of the destination ID.

b.

20 $h$—(long frame) data for the output device.
28 $h$—(long frame) data for the input device.
Meaning: The data in this frame is to be sent to the indicated device of the destination ID.
Response:
ACK—the data was received okay.
NAK—parity or checksum error in the data (resend it). no response if the source ID is not logged onto the destination ID.

c.

30 $h$—logoff of output device
38 $h$—logoff of input device
Meaning: The source ID is logging off of the destination ID.
Response: always ACK, regardless of the situation.

d.

40 $h$—"crosscheck" for output device.
48 $h$—"crosscheck" for input device.
Meaning: This frame is issued when the destination ID is logged on to a device of the source ID. The source ID is checking to see if the destination ID is still logged on to its indicated device.
Response:
ACK—the destination ID is logged on to the device.
NAK—the destination ID is NOT logged on to the device.

e.

50 $h$—logon to output device.
58 $h$—logon to input device.
Meaning: The source ID requests to logon to the indicated device of the destination ID.
Response:
ACK—the source ID is now logged on.
NAK—the source ID cannot logon. This is most often because another unit is logged on to the destination ID.

f.

60 $h$—"super" logon to output device.
68 $h$—"super" logon to input device.
This is the same as the regular logon frame, except that if someone else is logged on to the destination ID, the source ID will be put at the FRONT of the waiting queue, so it will be the next ID to get the indicated device. This command is not normally used, except in a few regular Systemizer custom ROMs.
The following frames are recognized only by the Systemizer Plus g.
7b h—(long frame) full duplex data
Meaning: The data in this frame is full duplex data received by the source IDs output device and intended for the destination ID.
Response:
ACK—data was received okay.
NAK—data was not received okay (resend it).

h.
88 h—(long frame) full duplex data resent
Meaning: The data in this frame is a resent of full duplex data. Full duplex data is originally sent with 78 h. If the data is not acknowledged, then it is resent with this command a couple times.

i.
90 h—roll call (output device)
98 —roll call (input device)
Meaning: The source ID is checking to see if the destination ID exists.
ACK—the destination ID exists, and no one is logged onto the indicated device.
NAK—the destination ID exists, and someone is logged onto the indicated device.

j.
a0 h—the output device is offline.
a8h—the input device if offline.
Meaning: This frame is issued by the source ID when the destination ID is logged on to the indicated device, and the device is offline. This command will be issued every two or three seconds until the device goes back on line.
No response expected.

k.
b0h—group of mail commands. The subgroup field determines the exact mail command.
b1h—mail query.
Meaning: This frame is issued to query the destination ID for certain information, including electronic mail status.
Response: The response is several bytes of information about the destination ID.
b2h—seize mailbox
Meaning: the source ID is requesting to seize (or logon) to the destination ID's mailbox, so that the source ID can send a mail message.
Response:
ACK—mailbox seized okay.
NAK—mailbox is already seized by someone else.
ERR—destination ID is not set for electronic mail.
b3h—release mailbox and accept mail
Meaning: the source ID is releasing the destination ID's mailbox (which the source ID has seized), and requesting that the mail message the source ID just sent be accepted by the destination ID.
Response:
ACK—mail accepted, mailbox released okay.
ERR—the destination ID's mailbox is not seized by the source ID.
b4h—release mailbox and reject mail
Meaning: the source ID is releasing the destination ID's mailbox (which the source IF has seized), and requesting that the mail message the source ID just sent be rejected by the destination ID.
Response: always ACK.
b5h—mail data send (long frame)
b6h—mail data resent (long frame)
meaning—the source ID is sending this frame of mail data to the destination ID. The source ID must have first seized the destination ID's mailbox. If a frame of mail data is not ACKed, it is re-sent with the 'mail data resend' command.
Response:
ACK—mail data received okay.
NAK—mailbox overflowed, mail data not received okay.
ERR—parity or checksum error, or mailbox not seized by source ID.

l.
c0n—carrier detect status for output device.
Meaning: The source ID is reporting the status of the carrier detect signal of its output device to the destination ID. This command is sent a couple times a second when the source ID's output device is designated as a modem and the destination ID is logged onto the source ID's output device.
No response expected.

| Appendix 2 | |
|---|---|
| /1MEG | Active LOW - indicates that a 1 meg memory board is installed |
| ,2X4 | Active LOW - indicates that a 256K × 4 memory board is installed |
| A0-A19 | Active HIGH - Address Bus |
| A0/8 | multiplexed A0 and A8 for Dynamic RAMs |
| A1/9 | multiplexed A1 and A9 for Dynamic RAMs |
| A2/10 | multiplexed A2 and A10 for Dynamic RAMs |
| A3/11 | multiplexed A3 and A11 for Dynamic RAMs |
| A4/12 | multiplexed A4 and A12 for Dynamic RAMs |
| A5/13 | multiplexed A5 and A13 for Dynamic RAMs |
| A6/14 | multiplexed A6 and A14 for Dynamic RAMs |
| A7/15 | multiplexed A7 and A15 for Dynamic RAMs |
| /A13*/A12 | Active HIGH - indicates A12 and A13 are both LOW |
| /A15 | Active LOW - inverted Address 15 |
| A17/16 | multiplexed A17 and A16 for Dynamic RAMs |
| ACK | Active HIGH - indicates that data has been received by the parallel data port |
| /AUXIN | Active LOW - AUXiliary INput port chip enable |
| /AUXOUT | Active LOW - AUXiliary OUTput port chip enable |
| /BUSACK | Active LOW - processor BUS ACKnowledge status, response to /BUSREQ (not used) |
| /BUSREQ | Active LOW - processor BUS REQuest control signal (not used) |
| BUSY | Active HIGH - indicates that the parallel data port is unable to receive data |
| /CAS | Active LOW - Column Address Select used by Dynamic RAMs |
| CDCOM | RS-232C Active HIGH - Carrier Detect signal to the Computer |
| CDMOD | RS-232C Active HIGH - Carrier Detect signal from the Modem |
| CLOCK | system CLOCK |
| CKA/TEND0 | ClocK to/from Async. serial channel 1 or Active LOW - DMA Transfer END channel 0 control signal (not used) |
| CKS | ClocK for clocked Serial channel (not used) |
| CTS0 | Clear To Send to async. serial channel 0 (not used) |
| D0-D7 | Data Bus |
| DCD0 | Active LOW - Data Carrier Detect for async. serial channel 0 (not used) |
| /DREQ0/CKA0 | Active LOW - DMA Request channel 0 or ClocK for Async. serial channel 0 (not used) |
| /DREQ1 | Active LOW - DMA Request channel 1 (not used) |
| /DSW1CE | Active LOW - Dip SWitch 1 port Chip Enable |
| /DTRCOM | RS-232C active HIGH - Data Terminal Ready request to COMputer |
| DTRPTR | RS-232C active HIGH - Data Terminal Ready request from PrinTeR |
| E | Active LOW - processor Enable control signal |

Appendix 2 -continued

| Signal | Description |
|---|---|
| /EEROMCE | Active LOW - Electrically Erased programmable Read Only Memory Chip Enable |
| GND | zero volts |
| HALT | Active LOW - processor STatus signal (not used) |
| /INT0 | Active LOW - INTerrupt level 0 request (not used) |
| /INT1 | Active LOW - INTerrupt level 1 request (used for SINT) |
| /INT2 | Active LOW - INTerrupt level 2 request (used for PINT) |
| /INTR | Active LOW - processor Input/Output Enable control signal |
| /IOE/ME | |
| /LEDPORT | Active LOW - enables LED PORT to be written |
| /LIR | Active LOW - processor Load Instruction Register control signal (not used) |
| /ME | Active LOW - processor Memory Enable control signal |
| /NETSTAI | Active LOW - NET STatus A (primary) Input |
| /NETSTAO | Active LOW - NET STatus A (primary) Output |
| /NETSTBI | Active LOW - NET STatus B (secondary) Input |
| /NETSTBO | Active LOW - NET STatus B (secondary) Output |
| /NMI | Active LOW - Non-Maskable Interrupt request |
| /NMIMSK | Active LOW - Non-Maskable Interrupt MaSK (disable) |
| /NMIRST | Non-Maskable Interrupt request ReSeT |
| N/C | No Connection |
| PACKCOM | Active HIGH - Parallel ACKnowledge to COMputer |
| PBUSYPTR | Active HIGH - Parallel BUSY from PrinTeR |
| /PDATOUT | Active LOW - write Parallel DATa to OUTput latch |
| /PDATRD | Active LOW - to enable Parallel DATa to be ReaD from input latch |
| /PINT | Active LOW - Parallel data INTerrupt |
| PSTBIN | Active HIGH - Parallel STroBe INput from computer status |
| PSTBOUT | Active HIGH - Parallel STroBe OUTput to printer status |
| PSTBPTR | Active HIGH - Parallel STroBe to PrinTeR |
| /PSTBRST | Active LOW - Parallel output StroBe ReSeT |
| /RAM | Active LOW - Random Access Memory address selection |
| /RAS | Active LOW - Row Address Select (bank 3) for main board Dynamic RAMs |
| /RAS0 | Active LOW - Row Address Select (bank 0) for extended memory Dyanmic RAMs or Row Address Select for 1 meg Dynamic RAMs |
| /RAS1 | Active LOW - Row Address Select (bank 1) for extended memory Dynamic RAMs |
| /RAS2 | Active LOW - Row Address Select (bank 2) for extended memory Dynamic RAMs or A18 and A19 multiplexed address for 1 meg rams |
| /RD | Active LOW - processor ReaD control signal |
| /REF | Active LOW - processor REFresh cycle control signal |
| /RESET | Active LOW - system Reset |
| /ROMCE | Active LOW - programmable Read Only Memory Chip Enable |
| RTS0 | Request To Send from async. serial channel 0 |
| RXA0 | Active LOW - data to be received (RX) by Async. serial channel 0 |
| RXA1 | Active LOW - data to be received (RX) by Async. serial channel 1 |
| /RXD | RS-232C active HIGH - received (RX) |
| RXDCOM | Data from COMputer |
| RXDNET | Active LOW - received (RX) Data from Systemizer NETwork |
| RXDPTR | RS-232C active HIGH - received (RX) Data from PrinTeR |
| RXS/CTS1 | Active LOW - received (RX) Data ClocK for clocked Serial channel or Clear To Send to async. serial channel 1 (not used) |
| /SERCE | Active LOW - SERial (UART. 2691) Chip Enable |
| /SINT | Active LOW - Serial data INTerrupt request |
| ST | Active LOW - processor STatus signal (not used) |
| /STB | Active LOW - parallel STroBe signal (from computer or to printer) |
| /TEND1 | Active LOW - DMA Transfer END channel 1 control signal (not used) |
| /TIMER | Active LOW - TIMER interrupt request |
| TOUT / A18 | Timer OUTput (not used) OR A18 |
| TA0 | Active LOW - data trasmitted (TX) by Async. serial channel 0 |
| TXA1 | Active LOW - data transmitted (TX) by Async. serial channel 1 |
| TXDCOM | RS-232C active HIGH - trasmitted (TX) Data to COMputer |
| TXDNET | Active LOW - transmitted (TX) Data to Systemizer NETwork |
| /TXDPTR | RS-232C active HIGH - transmitted (TX) Data to PrinTeR |
| TXS | Active LOW - data transmitted (TX) by clocked serial channel (not used) |
| VCC | zero Volts (GND) |
| VSS | +5 Volts DC |
| /WAIT | Active LOW - WAIT state request (not used) |
| /WR | Active LOW - procesor WRite control signal |

We claim:

1. An improvement in a method of communicating digital information in a computer network comprising a plurality of source computer means for providing a source and destination of digital information, a corresponding plurality of network controller means coupled to and selectively communicating with said plurality of source computer means, and a corresponding plurality of input/output devices for selectively providing input and/or output functions, said input/output devices coupled to certain ones of said network controller means, the improvement comprising the steps of:

sending a full duplex data frame to a selected one of said network controller means, designated as a receiving controller means from another one of said network controller means designated as a sending controller means, said sending controller means requesting to log onto a selected one of said input/output devices that is coupled to said receiving controller means; and obtaining a response from said receiving controller means to the data frame sent by said sending controller means, which response is indicative of whether the selected input/out device is in use or available and whether said sending controller means can log onto said selected input/output device if available, whereby said digital information may be transmitted from said source computer means to said selected input/output device as well as to said source computer means from said device, provided that said sending controller means is logged onto the selected input/output device of said receiving controller means.

2. The method of claim 1 where, if said sending controller means successfully logs onto said receiving controller means, said improvement further comprises the steps of:

sending a status-check frame to said receiving controller means from said sending controller means;

waiting for a response from said receiving controller means to said sending controller means to verify that said receiving controller means is still adapted to receive data frames from said sending controller means;

said sending controller means responding when there is no response from said receiving controller means buy providing an indication that said sending controller means is no longer logged onto said selected input/out device.

3. The improvement of claim 2 further comprising the steps of:

obtaining a block of data from memory within said sending controller means, said block of data sent to and stored in said sending controller means from said source computer means;

selectively sending a data frame to said receiving network controller means from said memory in said sending controller means;

waiting in said sending controller means for a response from said receiving network controller means;

said sending controller means responding to said response from said receiving controller means buy sending said block of data to said receiving controller means for transmission to said input/output device thereof.

4. The improvement of claim 3 where the method further comprises the step of sending a log-off frame to said receiving controller means.

5. The improvement of claim 4 wherein said device is another one of said plurality of source computer means so that said step of sending a full duplex data frame comprises a step of obtaining said full duplex data frame from said other one of said plurality of source computer means.

6. The improvement of claim 5 where said method further comprises sending and receiving said full duplex data frames to and from a modem.

7. The improvement of claim 4 where said method further comprises sending and receiving said full duplex data frames to and from a modem.

8. The improvement of claim 1 wherein said device is another one of said plurality of source computer means so that said step of sending a full duplex data frame comprises a step of obtaining said full duplex data frame from said other one of said plurality of source computer means.

9. The improvement of claim 1 where said method further comprises sending and receiving said full duplex data frames to and from a modem.

10. The method of claim 1, where if said sending controller means fails to log onto the selected input/output device of said receiving controller means, said improvement further comprises the step of continuing to send full duplex data frames to said receiving controller means until the selected input/output device thereof is no longer in use, whereupon said sending controller means can log onto said selected input/output device.

11. An improvement in a method in a computer network comprising a plurality of source computer means for providing a source and destination for digital information, a corresponding plurality of network controller means for storing and bidirectionally communicating digital information, each one of said plurality of network controller means uniquely identified by an ID number and coupled to a corresponding one of said plurality of source computer means, and a plurality of devices coupled to said plurality of network controller means, the improvement comprising the steps of:

selecting in one of said network controller means, designated as a sending controller means, one of said ID numbers from a user defined list of said ID numbers corresponding to a selected one of said network controller means, temporarily designated as a receiving controller means;

attempting in said sending controller means to log onto a one of said devices coupled to a corresponding receiving controller means having said selected ID number associated therewith;

determining in said sending controller means whether said attempted log onto said selected receiving controller means was successful;

if said attempted log on was not successful, determining in said sending controller means if other ID numbers can be selected from said user defined list; and continuing in said sending controller means with said step of selecting an ID number with another selected one of said ID numbers in said user defined list followed by said steps of attempting log on and determining whether log on was successful until log on is successful, whereby a select one of said source computer means utilizing said user defined list automatically selects and is logged onto one of said plurality of devices without user intervention.

12. An improvement in a method of digital communication in a computer network comprising a plurality of source computer means for generating and accepting digital information, a corresponding plurality of network controller means coupled to said plurality of source computer means, and a plurality of corresponding devices coupled to said corresponding plurality of network controller means, one of said devices being a modem, one of said network controller means designated as a sending controller means, said sending controller means adapted to be logged onto the modem coupled to another one of said network controller means designated as a receiving controller means, said improvement comprising the steps of:

in said receiving controller means reading the status of a carrier detect signal from said modem coupled thereto; and sending a carrier-detect frame to said sending controller means when said sending controller means is logged onto the modem coupled to said receiving controller means, said carrier-detect frame including information used to provide a logic signal to said source computer means to indicate a realtime status of said modem's carrier-detect signal, said carrier-detect frame including information indicative of whether a carrier detect signal is present on said modem.

13. The improvement of claim 12 where prior to said step of reading said status of carrier-detect signal, a determination is made whether said device corresponding to said receiving network controller means is a modem.

14. The improvement of claim 12 where after said carrier-detect frame is received in said sending controller means from said receiving controller means, said sending controller means sends a carrier-detect signal to said source computer means according to the indication provided within said carrier-detect frame.

15. An improvement in a method in a computer network comprising a plurality of source computer means for providing a source and destination for digital information, a plurality of network controller means for storing and bidirectionally sending and receiving information, said corresponding plurality of network controller means coupled to said plurality of said source computer means, and a corresponding plurality of devices coupled to said plurality of network controller means, said improvement comprising the steps of:
  testing whether a selected one of said devices is busy during a predetermined time interval; and
  sending a device off-line message to said one network controller means attempting to log onto said device if said step of testing shows said device to be off-line for said predetermined time interval,
  whereby device off-line detection is provided within said computer network.

16. An improvement in a method in a computer network comprising a plurality of source computer means for providing a source and destination for digital information, a corresponding plurality of network controller means for storing and bidirectionally communicating said information, said plurality of network controller means coupled to corresponding ones of said computer source means, and a plurality of devices coupled to said plurality of network controller means, said improvement comprising the steps of:
  sending a seize-mailbox frame to a selected one of said plurality of network controller means, designated as a receiving controller means, from another one of said network controller means, designated as a sending network controller means;
  waiting for a response from said receiving network controller means;
  said sending controller means responding to said response from said receiving controller means by sending a status message to indicate that the mailbox is either available or already seized by another one of said network controller means,
  whereby electronic mail is provided within said computer network if said status message indicates that said mailbox is available.

17. The improvement of claim 16 further comprising the steps of sending a mail-data frame to said receiving network controller means;
  waiting in said sending controller means for a response from said receiving network controller means;
  said sending controller means responding to said response from said receiving network controller means to resend said mail-data frame, to indicate that said receiving controller means' mailbox is full, to indicate an error message, or to detect successful transmission of said mail-data frame to said receiving controller means;
  determining whether said mail message has been completely sent; and
  selectively sending another block of said mail message if said step of determining indicates that said mail message has not been completely sent.

18. The method of claim 17 where, if said step of determining indicates that said mail message has been completely sent, further comprising the steps of:
  sending a release-mailbox and accept-mail frame from said sending controller means to said receiving controller means;
  waiting in said sending controller means for response from said receiving network controller means; and
  said sending controller means responding to said response received from said receiving controller means to indicate that mail was successfully sent or to indicate that an error occurred.

19. The improvement of claim 17 where, if said step of selectively reacting to said response from said receiving controller means indicates an error occurred, further comprising the step of sending a release-mailbox and reject-mail frame to said receiving controller means from said sending controller means.